US012763066B2

(12) United States Patent
Nishizawa et al.

(10) Patent No.: US 12,763,066 B2
(45) Date of Patent: Oct. 13, 2026

(54) SYSTEM, SUPPORT METHOD, SERVER APPARATUS AND COMMUNICATION PROGRAM

(71) Applicants: DAIKIN INDUSTRIES, LTD., Osaka (JP); Fairy Devices Inc., Tokyo (JP)

(72) Inventors: Miyu Nishizawa, Osaka (JP); Masato Fujino, Tokyo (JP)

(73) Assignees: DAIKIN INDUSTRIES, LTD., Osaka (JP); Fairy Devices Inc., Tokyo (JP)

( * ) Notice: Subject to any disclaimer, the term of this patent is extended or adjusted under 35 U.S.C. 154(b) by 0 days.

(21) Appl. No.: 19/105,244

(22) PCT Filed: Aug. 29, 2023

(86) PCT No.: PCT/JP2023/031135
§ 371 (c)(1),
(2) Date: Feb. 20, 2025

(87) PCT Pub. No.: WO2024/053476
PCT Pub. Date: Mar. 14, 2024

(65) Prior Publication Data
US 2025/0266034 A1 Aug. 21, 2025

(30) Foreign Application Priority Data
Sep. 5, 2022 (JP) ................................ 2022-140702

(51) Int. Cl.
*G10L 15/01* (2013.01)
*G10L 15/26* (2006.01)

(52) U.S. Cl.
CPC .............. *G10L 15/01* (2013.01); *G10L 15/26* (2013.01)

(58) Field of Classification Search
CPC .......... G10L 15/01; G10L 15/26; G10L 15/22
See application file for complete search history.

(56) References Cited

U.S. PATENT DOCUMENTS 9,218,806 B1 * 12/2015 Salvador ................ G10L 15/02
9,972,343 B1 * 5/2018 Thorson .................. G10L 15/08
10,592,735 B2 * 3/2020 Zhao ........................ H04N 7/15
10,971,153 B2 * 4/2021 Thomson ................ G10L 15/30
11,315,569 B1 * 4/2022 Talieh ................. H04L 12/1831
11,463,501 B2 * 10/2022 Kahl ....................... H04L 65/80
(Continued)

FOREIGN PATENT DOCUMENTS

CN 113380254 A * 9/2021 ............. G10L 15/26
DE 60205095 T2 * 5/2006 ............. G10L 15/26
(Continued)

OTHER PUBLICATIONS

International Preliminary Report on Patentability for PCT/JP2023/031135 mailed on Mar. 20, 2025.
(Continued)

*Primary Examiner* — Paras D Shah
*Assistant Examiner* — Oluwadamilola M Ogunbiyi
(74) *Attorney, Agent, or Firm* — IPUSA, PLLC

(57) ABSTRACT

A system for converting speech data into text data includes one or more control units that determine whether or not the speech data being acquired can be converted into the text data, or whether or not a quality of the converted text data after conversion of the speech data being acquired deteriorates, and output a determination result.

10 Claims, 16 Drawing Sheets

(56) References Cited

U.S. PATENT DOCUMENTS

| | | | | |
|---|---|---|---|---|
| 2003/0008633 | A1* | 1/2003 | Bartosik | G06Q 10/10 455/406 |
| 2006/0074651 | A1* | 4/2006 | Arun | G10L 15/22 704/E15.04 |
| 2007/0037536 | A1* | 2/2007 | Battaglini | G10L 15/22 455/212 |
| 2007/0078652 | A1* | 4/2007 | Chang | G10L 15/00 704/234 |
| 2007/0117546 | A1* | 5/2007 | Doulton | G10L 15/26 379/88.13 |
| 2007/0182595 | A1* | 8/2007 | Ghasabian | G06F 1/163 341/22 |
| 2007/0250841 | A1* | 10/2007 | Scahill | H04L 67/75 719/320 |
| 2008/0052071 | A1* | 2/2008 | Doulton | H04M 3/5183 704/235 |
| 2008/0154596 | A1* | 6/2008 | Da Palma | G10L 15/06 704/E15.047 |
| 2009/0018831 | A1* | 1/2009 | Morita | G10L 15/24 704/E15.04 |
| 2009/0125299 | A1* | 5/2009 | Wang | G10L 15/22 704/E15.001 |
| 2009/0157205 | A1* | 6/2009 | Inoue | H04N 21/44209 700/94 |
| 2010/0153108 | A1* | 6/2010 | Szalai | G10L 17/04 704/243 |
| 2010/0250248 | A1* | 9/2010 | Willins | G10L 15/20 704/E15.04 |
| 2013/0080177 | A1* | 3/2013 | Chen | G10L 15/183 704/275 |
| 2013/0218575 | A1* | 8/2013 | Konishi | G10L 21/06 704/275 |
| 2014/0207451 | A1* | 7/2014 | Topiwala | G10L 15/32 704/235 |
| 2015/0331665 | A1 | 11/2015 | Ishii et al. | |
| 2016/0098992 | A1* | 4/2016 | Renard | G10L 15/30 704/275 |
| 2016/0112561 | A1* | 4/2016 | Milstein | G10L 15/10 379/88.01 |
| 2016/0140952 | A1* | 5/2016 | Graham | G10L 13/033 704/260 |
| 2017/0092274 | A1* | 3/2017 | Kaufmann | G10L 15/26 |
| 2017/0116987 | A1* | 4/2017 | Kang | G10L 15/26 |
| 2017/0178627 | A1* | 6/2017 | Firby | G10L 15/22 |
| 2017/0194000 | A1* | 7/2017 | Itani | G10L 15/32 |
| 2017/0301351 | A1* | 10/2017 | Yuan | G10L 13/00 |
| 2018/0061419 | A1* | 3/2018 | Melendo Casado | G10L 25/78 |
| 2018/0067928 | A1* | 3/2018 | Miura | G06F 40/58 |
| 2018/0077483 | A1* | 3/2018 | Sahay | G10L 15/1822 |
| 2018/0158089 | A1* | 6/2018 | Tort | G06Q 30/0218 |
| 2018/0275951 | A1* | 9/2018 | Kagoshima | G06F 3/167 |
| 2018/0366118 | A1* | 12/2018 | Lovitt | G10L 15/063 |
| 2019/0122685 | A1* | 4/2019 | Defraene | G06N 3/08 |
| 2019/0164543 | A1* | 5/2019 | An | G10L 15/22 |
| 2019/0175011 | A1* | 6/2019 | Jensen | A61B 3/0025 |
| 2019/0228774 | A1* | 7/2019 | Chevrier | G10L 15/22 |
| 2019/0385607 | A1* | 12/2019 | Kim | G06F 3/167 |
| 2020/0004396 | A1* | 1/2020 | DeLuca | G10L 15/22 |
| 2020/0043519 | A1* | 2/2020 | Ramos | G10L 15/22 |
| 2020/0045166 | A1* | 2/2020 | Furuta | H04M 3/002 |
| 2020/0065714 | A1* | 2/2020 | Leminen | G06N 20/00 |
| 2020/0143807 | A1* | 5/2020 | Ko | G10L 15/20 |
| 2020/0175987 | A1* | 6/2020 | Thomson | G10L 15/26 |
| 2020/0243094 | A1* | 7/2020 | Thomson | G10L 15/28 |
| 2020/0243103 | A1* | 7/2020 | Gilson | G10L 15/22 |
| 2020/0265856 | A1* | 8/2020 | Gummadi | G10L 25/60 |
| 2020/0290198 | A1* | 9/2020 | Yanase | A63F 13/58 |
| 2020/0311354 | A1* | 10/2020 | Furukawa | G06F 3/167 |
| 2020/0342876 | A1* | 10/2020 | Woike | G10L 13/04 |
| 2020/0365152 | A1* | 11/2020 | Han | G10L 15/02 |
| 2020/0404065 | A1* | 12/2020 | Schissel | H04L 67/75 |
| 2021/0005190 | A1* | 1/2021 | Ji | G06F 3/167 |
| 2021/0110812 | A1* | 4/2021 | Naylor-Teece | H04R 29/001 |
| 2021/0120209 | A1* | 4/2021 | Peters | H04N 7/152 |
| 2021/0142789 | A1* | 5/2021 | Gurbani | G10L 15/26 |
| 2021/0142796 | A1 | 5/2021 | Saito | |
| 2021/0144191 | A1* | 5/2021 | Kahl | G10L 15/26 |
| 2021/0166677 | A1* | 6/2021 | Yamamoto | G06F 3/167 |
| 2021/0174799 | A1 | 6/2021 | Watanabe et al. | |
| 2021/0233030 | A1* | 7/2021 | Preuss | G09B 7/00 |
| 2021/0343271 | A1* | 11/2021 | Aher | G10L 15/20 |
| 2021/0389924 | A1* | 12/2021 | Chong | H04W 12/02 |
| 2022/0021985 | A1* | 1/2022 | Wexler | G10L 25/51 |
| 2022/0038820 | A1* | 2/2022 | Graham | G06F 3/04847 |
| 2022/0067803 | A1* | 3/2022 | Kim | G10L 15/26 |
| 2022/0070580 | A1* | 3/2022 | Iida | G10L 21/0232 |
| 2022/0084523 | A1* | 3/2022 | Matula | G10L 15/26 |
| 2022/0086724 | A1* | 3/2022 | Kwatra | H04B 17/318 |
| 2022/0092274 | A1* | 3/2022 | Arivazhagan | G06F 40/47 |
| 2022/0164378 | A1* | 5/2022 | Daley | G06F 16/532 |
| 2022/0172725 | A1* | 6/2022 | Khan Khattak | G10L 15/1822 |
| 2022/0180886 | A1* | 6/2022 | Weng | H04R 1/1083 |
| 2022/0208184 | A1* | 6/2022 | Purohit | G10L 17/18 |
| 2022/0208207 | A1* | 6/2022 | Zheng | G10L 21/0208 |
| 2022/0276701 | A1 | 9/2022 | Kuroda et al. | |
| 2022/0301558 | A1* | 9/2022 | Carmeli | G10L 15/1822 |
| 2022/0301561 | A1* | 9/2022 | Robert Jose | G10L 15/32 |
| 2022/0392435 | A1* | 12/2022 | Saadatpanah | G06F 16/686 |
| 2023/0047666 | A1* | 2/2023 | Lin | G10L 25/18 |
| 2023/0063839 | A1* | 3/2023 | Bromand | H04R 3/005 |
| 2023/0077037 | A1* | 3/2023 | Zimmerman | G10L 15/01 |
| 2023/0115674 | A1* | 4/2023 | Nighman | H04R 1/406 381/58 |
| 2023/0270389 | A1* | 8/2023 | Randall | A61B 5/0022 600/586 |
| 2023/0319121 | A1* | 10/2023 | Smith | H04M 3/568 |
| 2023/0410801 | A1* | 12/2023 | Mishra | H04L 51/02 |
| 2023/0419967 | A1* | 12/2023 | Hornberger | G10L 15/26 |

FOREIGN PATENT DOCUMENTS

| | | | | | |
|---|---|---|---|---|---|
| EP | 3931826 | B1 * | 6/2025 | G10L 15/02 |
| JP | 2006208751 | A * | 8/2006 | G10L 15/24 |
| JP | 2012-078650 | | 4/2012 | |
| JP | 2020-101822 | | 7/2020 | |
| JP | 2021-002747 | | 1/2021 | |
| JP | 2021-089576 | | 6/2021 | |
| WO | WO-02075724 | A1 * | 9/2002 | G10L 15/26 |
| WO | 2017/168936 | | 10/2017 | |
| WO | WO-2020220345 | A1 * | 11/2020 | G10L 15/20 |
| WO | 2021/100331 | | 5/2021 | |
| WO | WO-2021169356 | A1 * | 9/2021 | G10L 25/51 |

OTHER PUBLICATIONS

International Search Report for PCT/JP2023/031135 mailed on Nov. 14, 2023.

Extended European search report mailed on Dec. 8, 2025 with respect to the corresponding EP patent application No. 23863015.6.

* cited by examiner

100

(a)

(b)

SYSTEM, SUPPORT METHOD, SERVER APPARATUS AND COMMUNICATION PROGRAM

TECHNICAL FIELD

The present disclosure relates to systems, support methods, server apparatuses, and communication programs.

BACKGROUND ART

A bidirectional communication system, which enables remote communication by bidirectionally transmitting and receiving video data and speech data, is known. In the bidirectional communication system, a speech-to-text function or the like may be used, for example, to enable a real-time speech recognition and conversion of a user's speech content into text data. As a result, the bidirectional communication system can manage the user's speech content as character information.

PRIOR ART DOCUMENTS

Patent Documents

Patent Document 1: Japanese Laid-Open Patent Publication No. 2021-2747

DISCLOSURE OF THE INVENTION

Problem to be Solved by the Invention

However, in the case of the bidirectional communication system described above, there are situations where a portion of the speech content cannot be recognized appropriately due to various causes, such as a malfunction of a microphone, a deterioration of a communication state, an influence of surrounding environmental sound, or the like.

On the other hand, even when it is found that a portion of the speech content is not converted into appropriate text data after the remote communication ends, it is difficult to restore the text data.

The present disclosure enables a user to identify a situation unsuitable for a speech recognition generated in a system that performs the speech recognition of a speech content.

Means of Solving the Problem

A first aspect of the present disclosure relates to a system for converting speech data into text data, comprising:

one or more control units configured to:

determine, during acquisition of the speech data, whether or not the speech data being acquired can be converted into the text data, or whether or not a quality of converted text data after conversion of the speech data being acquired deteriorates; and output a determination result.

According to the first aspect of the present disclosure, in a system that performs a speech recognition of a speech content, a user can recognize the occurrence of a situation unsuitable for the speech recognition.

A second aspect of the present disclosure relates to the system of the first aspect, wherein the one or more control units are configured to:

indicate and output a cause the speech data cannot be converted into the text data, or a cause the quality of converted text data after the conversion deteriorates.

A third aspect of the present disclosure relates to the system of the second aspect, wherein the cause includes one cause among an influence of an environmental sound around a speech acquisition device configured to acquire the speech data, an influence of preceding speech data preceding the speech data on the speech data, and a malfunction of the speech acquisition device.

A fourth aspect of the present disclosure relates to the system of the third aspect, wherein the one or more control units are configured to:

determine that the quality of the converted text data deteriorates due to the influence of the environmental sound, in a case where a magnitude of environmental audio data acquired during the acquisition of the speech data is greater than or equal to a predetermined threshold value, or in a case where a ratio between the magnitude of the speech data and a magnitude of the environmental audio data acquired during the acquisition of the speech data satisfies a predetermined condition.

A fifth aspect of the present disclosure relates to the system of the third or fourth aspect, wherein the one or more control units are configured to:

determine that the speech data cannot be converted into the text data due to the malfunction of the speech acquisition device, in a case where both of the magnitudes of the speech data being acquired and the environmental audio data acquired during the acquisition of the speech data are less than the predetermined threshold value.

A sixth aspect of the present disclosure relates to the system of any one of the second to fifth aspects, wherein the cause includes a deterioration of a communication state of a bidirectional communication.

A seventh aspect of the present disclosure relates to the system of the sixth aspect, wherein the one or more control units are configured to:

determine that the speech data cannot be converted into the text data due to the deterioration of the communication state, in a case where the bidirectional communication is disconnected during the acquisition of the speech data.

An eighth aspect of the present disclosure relates to the system of any one of the second to seventh aspects, further comprising:

a worker terminal used by a worker; a supporter terminal used by a supporter who remotely supports the worker; and a server apparatus configured to perform a bidirectional communication between the worker terminal and the supporter terminal, wherein a control unit included in the server apparatus converts the speech data into the text data.

A ninth aspect of the present disclosure relates to the system of the eighth aspect, further comprising:

a worker terminal used by a worker; a supporter terminal used by a supporter who remotely supports the worker; and a server apparatus configured to perform a bidirectional communication between the worker terminal and the supporter terminal, wherein a control unit included in the server apparatus converts the speech data into the text data.

A tenth aspect of the present disclosure relates to the system of the ninth aspect, wherein:

a control unit included in the server apparatus determines, during the acquisition of the speech data, whether or not the speech data being acquired can be converted into the text data, or whether or not the quality of the converted text data after the conversion of the speech data being acquired deteriorates, and a control unit included in the supporter terminal outputs the determination result.

An eleventh aspect of the present disclosure relates to the system of the ninth aspect, wherein:

the worker terminal includes a speech acquisition device configured to acquire the speech data, and the control unit of the server apparatus determines that the speech data cannot be converted into the text data due to a malfunction of the speech acquisition device, in a case where both a magnitude of the speech data being acquired and the magnitude of the environmental audio data acquired during the acquisition of the speech data are less than the predetermined threshold value.

A twelfth aspect of the present disclosure related to the system of the ninth aspect, wherein the control unit included in the server apparatus determines that the speech data cannot be converted into the text data by a control unit of the worker terminal due to a deterioration of a communication state of the bidirectional communication, in a case where the speech data is not transmitted from the worker terminal for a certain period of time and the bidirectional communication is disconnected.

A thirteenth aspect of the present disclosure relates to the system of any one of the tenth to twelfth aspects, wherein a control unit included in the supporter terminal displays the determination result using an icon indicating a cause the speech data cannot be converted into the text data, or a cause the quality of the converted text data after the conversion deteriorates.

A fourteenth aspect of the present disclosure relates to the system of the tenth or eleventh aspect, wherein a control unit included in the worker terminal is configured to:

determine, during the acquisition of the speech data, whether or not the speech data being acquired can be converted into the text data, or whether or not the quality of the converted text data after the conversion the speech data being acquired deteriorates; and notify the determination result by at least one of sound, light, and vibration.

A fifteenth aspect of the present disclosure relates to the system of any one of the ninth to fourteenth aspects, wherein the control unit of the server apparatus stores the text data and the determination result in association with each other.

A sixteenth aspect of the present disclosure relates to the system of to the fifteenth aspect, wherein a control unit included in the supporter terminal reads the stored text data and displays the read text data in a display mode according to the determination result.

A seventeenth aspect of the present disclosure relates to the system of any one of the eighth to sixteenth aspects, wherein the control unit included in the server apparatus corrects a portion that cannot be converted into the text data or a portion where the quality deteriorates, using text data before and after the portion.

An eighteenth aspect of the present disclosure relates to the system of any one of the ninth to seventeenth aspects, wherein the control unit included in the server apparatus identifies a work content of the worker from an image captured by the worker terminal, and stores the identified work content in association with the determination result.

A nineteenth aspect of the present disclosure relates to the system of any one of the ninth to eighteenth aspects, wherein the control unit included in the worker terminal stores the acquired speech data, and in a case where a request is made from the server apparatus, transmits the speech data in a range according to the request to the server apparatus.

A twentieth aspect of the present disclosure relates to a support method for a system that converts speech data into text data, the support method comprising the steps of:

determining, during acquisition of the speech data, whether or not the speech data being acquired can be converted into the text data, or whether or not a quality of converted text data after conversion of the speech data being acquired deteriorates; and outputting a determination result of the determining.

A twenty-first aspect of the present disclosure relates to a server apparatus comprising a control unit configured to perform a bidirectional communication between a worker terminal used by a worker and a supporter terminal used by a supporter who remotely supports the worker, wherein the control unit is configured to:

convert speech data into text data; and transmit an instruction according to a determination result to the worker terminal or the supporter terminal, in a case where determining whether the speech data being acquired can be converted into the text data, or whether a quality of converted text data after conversion of the speech data being acquired deteriorates, during acquisition of the speech data by the worker terminal or the supporter terminal.

A twenty-second aspect of the present disclosure relates to a program causing a control unit of a server apparatus configured to perform a bidirectional communication between a worker terminal used by a worker and a supporter terminal used by a supporter who remotely supports the worker to perform a process including the steps of:

converting speech data into text data; and transmitting an instruction according to a determination result to the worker terminal or the supporter terminal, in a case where determining whether the speech data being acquired can be converted into the text data, or whether a quality of converted text data after conversion of the speech data being acquired deteriorates, during acquisition of the speech data by the worker terminal or the supporter terminal.

MODE OF CARRYING OUT THE INVENTION

Figure 1:
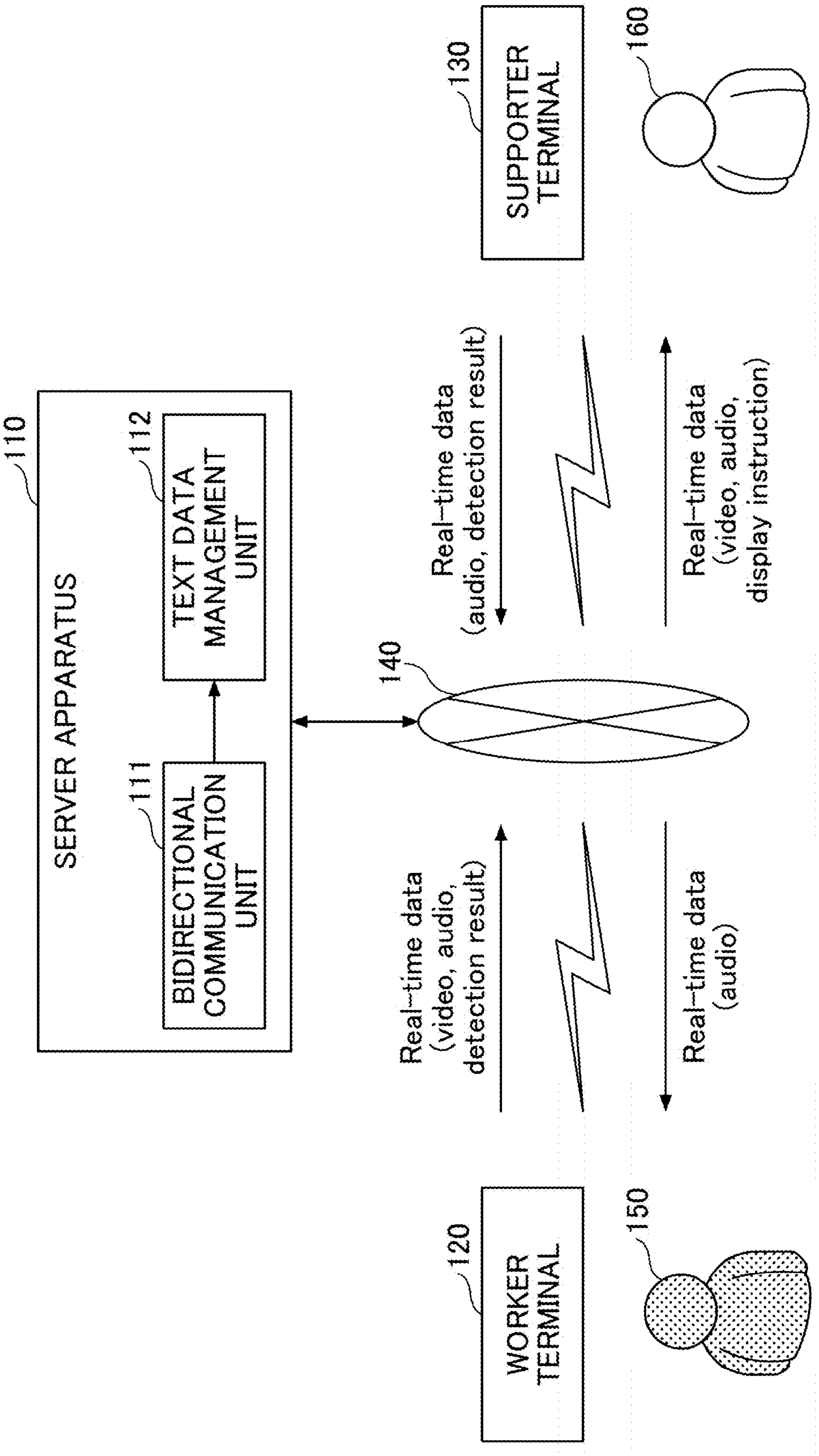
FIG. 1 is a first diagram illustrating an example of a system configuration of a bidirectional communication system.

Hereinafter, each of embodiments will be described with reference to the accompanying drawings. In the present specification and drawings, constituent elements having substantially the same functional configuration are designated by the same reference numerals, and a redundant description thereof will be omitted.

First Embodiment

System Configuration of Bidirectional Communication System

First, a system configuration of a bidirectional communication system, which is an example of a system according to a first embodiment, will be described. FIG. 1 is a first diagram illustrating an example of the system configuration of the bidirectional communication system. As illustrated in FIG. 1, a bidirectional communication system 100 includes a server apparatus 110 and client terminals (a worker terminal 120 and a supporter terminal 130).

The present embodiment describes a case where:

A worker 150 working at a work site; and

A supporter 160 remotely supporting the worker 150 by remotely instructing various work to the worker 150, communicate using the bidirectional communication system 100. For this reason, as described above, the client terminals constituting the bidirectional communication system 100 in the present embodiment include the worker terminal 120 used by the worker 150 and the supporter terminal 130 used by the supporter 160. However, the client terminals constituting the bidirectional communication system 100 are not limited to the combination of the worker terminal 120 and the supporter terminal 130.

The server apparatus 110 provides a cloud service (a bidirectional communication service) via a network 140. Specifically, a bidirectional communication program is installed in the server apparatus 110, and the server apparatus 110 functions as a bidirectional communication unit 111 and a text data management unit 112 by executing the program. Thus, the server apparatus 110 provides a bidirectional communication service with respect to the worker 150 and the supporter 160.

Specifically, in the server apparatus 110, the bidirectional communication unit 111 is communicably connected to the worker terminal 120 and the supporter terminal 130, and the bidirectional communication unit 111:

Transmits video data and audio data received from the worker terminal 120 to the supporter terminal 130;

Transmits a display instruction based on a detection result (details will be described later) or the like detected by the worker terminal 120 to the supporter terminal 130;

Transmits the audio data received from the supporter terminal 130 to the worker terminal 120; and Transmits a display instruction based on a detection result (details will be described later) detected by the supporter terminal 130, to the supporter terminal 130.

The bidirectional communication unit 111 determines:

Whether or not speech data based on a speech of the worker 150 being acquired by the worker terminal 120 can be converted into text data; or Whether or not a quality of converted text data after conversion of the speech data based on the speech of the worker 150 being acquired by the worker terminal 120 deteriorates, based on the detection result or the like detected by the worker terminal 120, and transmits a display instruction according to the determination result to the supporter terminal 130.

Similarly, the bidirectional communication unit 111 determines:

Whether or not speech data based on a speech of the supporter 160 being acquired by the supporter terminal 130 can be converted into text data; or Whether or not a quality of converted text data after the conversion of the speech data based on the speech of the supporter 160 being acquired by the supporter terminal 130 deteriorates, based on the detection result detected by the supporter terminal 130, and transmits a display instruction according to the determination result to the supporter terminal 130.

In the server apparatus 110, the text data management unit 112 converts the speech data, included in the audio data transmitted and received bidirectionally between the worker terminal 120 and the supporter terminal 130, into text data in real time, and stores the text data.

The worker terminal 120 is a wearable terminal worn by the worker 150 at the work site. In the present embodiment, the work site is in an environment in which the communication quality of the bidirectional communication easily deteriorates.

The worker terminal 120 includes a function of capturing a video of the work site, and a function of detecting audio including the speech (for example, speech based on the speech of the worker 150). The worker terminal 120 includes a function of transmitting the video data obtained by capturing the state of the work site, and the audio data including the speech data based on the speech of the worker 150 to the supporter terminal 130, via the network 140 and the server apparatus 110.

In addition, the worker terminal 120 detects a "state of environmental sound", a "state of a microphone", and a "communication state" which affect:

The conversion of the speech data into the text data based on the speech of the worker 150; or The quality of the text data after the conversion, and reports the detection result to the worker 150, and transmits the detection result on the "state of the environmental sound" and the "state of the microphone" to the server apparatus 110.

Moreover, the worker terminal 120 includes a function of receiving and outputting the audio data including the speech data based on the speech of the supporter 160.

The supporter terminal 130 is installed in an office where the supporter 160 resides, and is operated by the supporter 160, for example.

The supporter terminal 130 includes a function of detecting audio including speech (for example, speech based on the speech of the supporter 160). The supporter terminal 130 includes a function of transmitting the audio data including the speech data based on the speech of the supporter 160 to the worker terminal 120, via the network 140 and the server apparatus 110.

Further, the supporter terminal 130 detects a "state of environmental sound", a "state of a microphone", and a "communication state" which affect:

The conversion of the speech data into the text data based on the speech of the supporter 160; or the quality of the converted text data after the conversion, and transmits the detection result on the "state of the environmental sound" and the "state of the microphone" to the server apparatus 110.

In addition, the supporter terminal 130 includes a function of receiving and outputting the video data obtained by capturing the state of the work site, and the audio data including the speech data based on the speech of the worker 150.

Moreover, the supporter terminal 130 includes a function of displaying a display screen according to a display instruction (a display instruction based on the detection result detected by the worker terminal 120, a display instruction based on the detection result detected by the supporter terminal 130) or the like transmitted from the server apparatus 110.

Hardware Configuration of Each Apparatus

Figure 2:
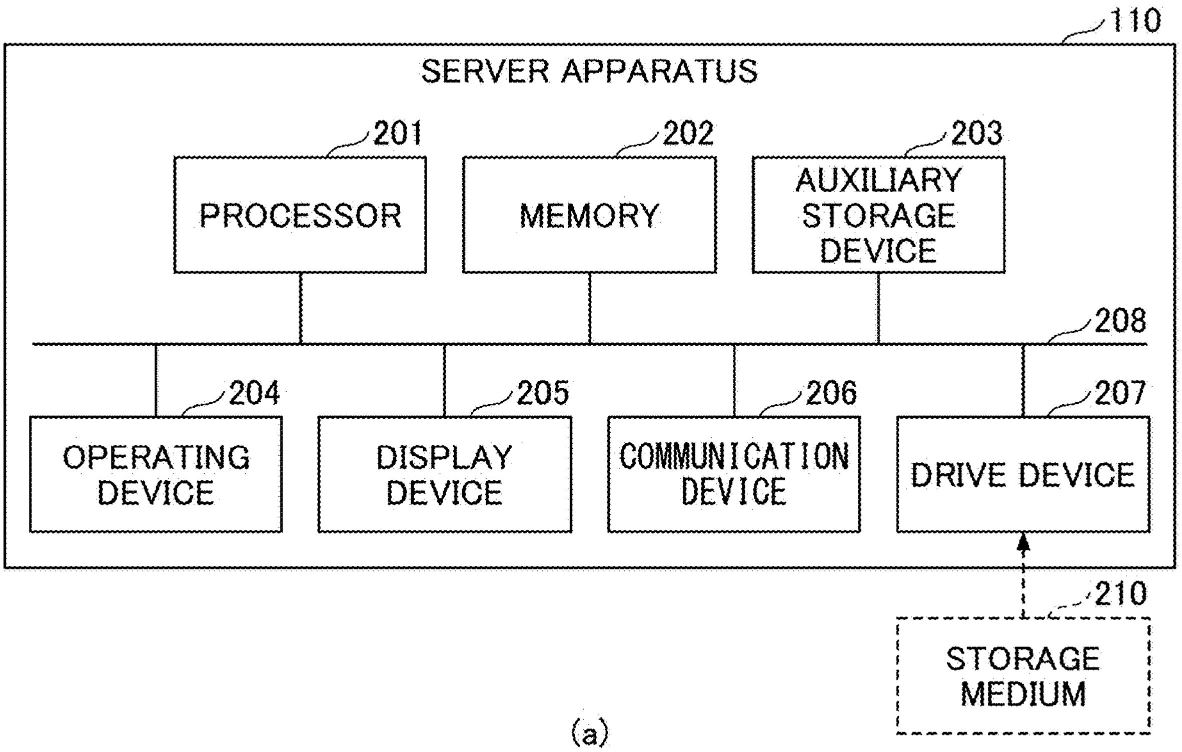
FIG. 2 is a diagram illustrating an example of a hardware configuration of a server apparatus and examples of hardware configurations of a worker terminal and a supporter terminal.
Figure 2:
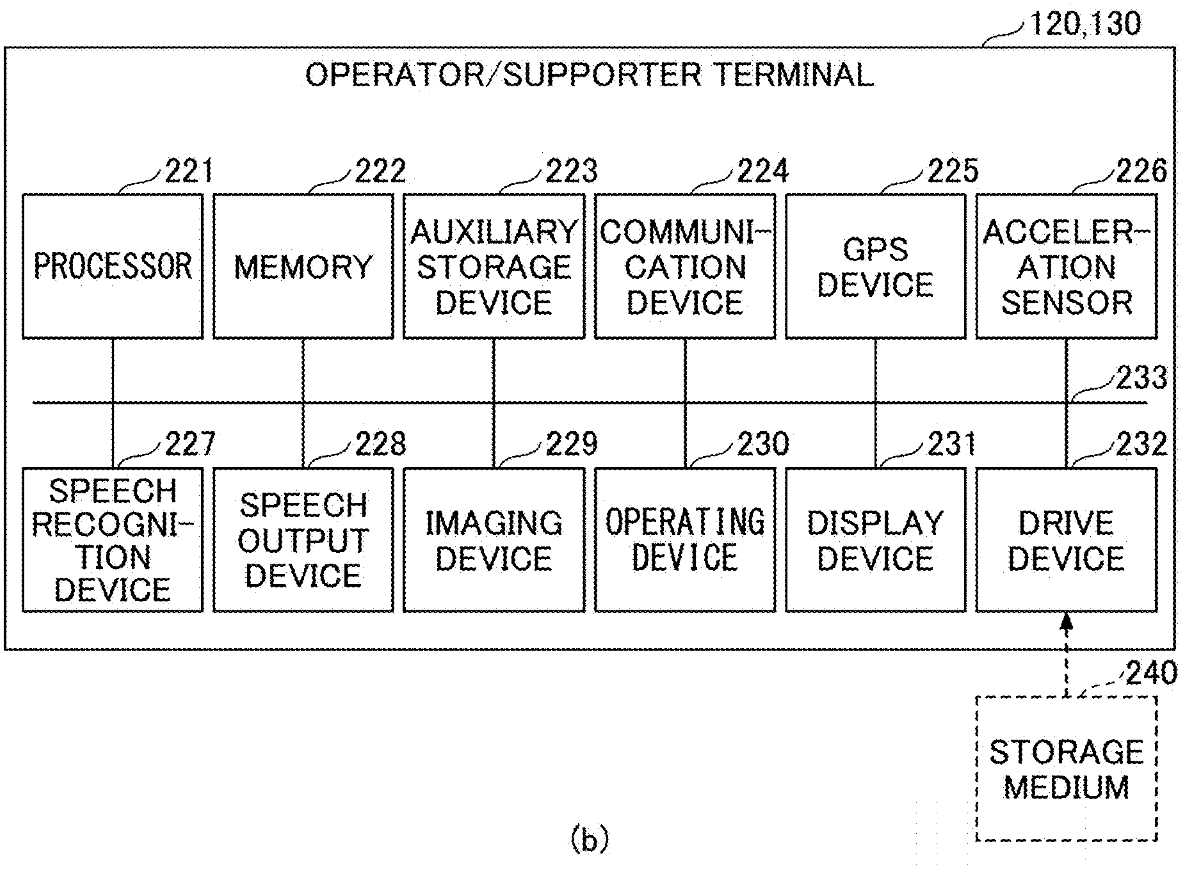

Next, a hardware configuration of each apparatus (the server apparatus 110, the worker terminal 120, and the supporter terminal 130) constituting the bidirectional communication system 100 will be described. FIG. 2 is a diagram illustrating an example of a hardware configuration of the server apparatus, and examples of hardware configurations of the worker terminal and the supporter terminal.

As illustrated in (a) of FIG. 2, the server apparatus 110 includes a processor 201, a memory 202, an auxiliary storage device 203, an operating device 204, a display device 205, a communication device 206, and a drive device 207. The hardware components of the server apparatus 110 are connected to one another via a bus 208.

The processor 201 includes various computational devices, such as a central processing unit (CPU) or the like. The processor 201 reads various programs (for example, a bidirectional communication program or the like) into the memory 202, and executes the various programs.

The memory 202 includes a main storage device, such as a read only memory (ROM), a random access memory (RA), or the like. The processor 201 and the memory 202 form a so-called computer (also referred to as a "controller"), and various functions are implemented by the computer when the processor 201 executes the various programs read into the memory 202.

The auxiliary storage device 203 stores various programs, and various data used when the various programs are executed by the processor 201. A text data storage unit 450 which will be described later is implemented by the auxiliary storage device 203.

The operating device 204 operated by an administrator of the server apparatus 110 to perform various operations. The display device 205 displays results of various processes performed by the server apparatus 110.

The communication device 206 communicates with an external device (for example, the worker terminal 120 or the supporter terminal 130) via the network 140.

A storage medium 210 can be loaded into the drive device 207. The storage medium 210 includes media configured to optically, electrically, or magnetically storing information, such as a CD-ROM, a flexible disk, a magneto-optical disk, or the like. In addition, the storage medium 210 may include a semiconductor memory or the like, configured to electrically store information, such as a ROM, a flash memory, or the like.

The various programs installed in the auxiliary storage device 203 are installed by loading the distributed storage medium 210 into the drive device 207 and reading the various programs stored in the storage medium 210 by the drive device 207, for example. Alternatively, the various programs installed in the auxiliary storage device 203 may be installed by being downloaded from the network 140 via the communication device 206.

On the other hand, as illustrated in (b) of FIG. 2, the worker terminal 120 and the supporter terminal 130 include a processor 221, a memory 222, an auxiliary storage device 223, and a communication device 224. In addition, the worker terminal 120 includes a global positioning system (GPS) device 225, an acceleration sensor 226, and an imaging device 229. Moreover, the worker terminal 120 and the supporter terminal 130 include a speech acquisition device 227, a speech output device 228, and an operating device 230. Further, the supporter terminal 130 includes a display device 231, and a drive device 232. The hardware constituting the worker terminal 120 and the hardware constituting the supporter terminal 130 are connected to each other via a bus 233.

The processor 221 includes various computational devices. such as a central processing unit (CPU) or the like. The processor 221 reads various programs (for example, a client program or the like described below) into the memory 222 and executes the various programs.

The memory 222 includes a main storage device, such as a read only memory (ROM), a random access memory (RAM), or the like. The processor 221 and the memory 222 form a so-called computer (also referred to as a "controller"), and various functions are implemented by the computer when the processor 221 executes the various programs read into the memory 222.

The auxiliary storage device 223 stores various programs, and various information used when the various programs are executed by the processor 221.

The communication device 224 is a device configured to transmit and receive various data (for example, video data, audio data, or the like) to and from the server apparatus 110. The GPS device 225 detects a position of the worker terminal 120, and outputs position data. The acceleration sensor 226 detects a movement of the worker 150 wearing the worker terminal 120, and outputs acceleration data.

The speech acquisition device 227 detects speeches based on speeches of the worker 150 and the supporter 160, environmental sound around the work site, environmental sound around the office, or the like, and outputs audio data.

The speech output device 228 is a device configured to output various data received from the server apparatus 110 to the worker 150 wearing the worker terminal 120 or the supporter 160 operating the supporter terminal 130 by speech.

The imaging device 229 captures an image of the surroundings (the work site) of the worker 150 wearing the worker terminal 120, and generates video data.

The operating device 230 receives a simple operation of the worker 150 on the worker terminal 120, such as operating a power ON/OFF switch or the like of the worker terminal 120. Alternatively, the operating device 230 receives various operations of the supporter 160 with respect to the supporter terminal 130.

The display device 231 is a device configured to display the video data received from the server apparatus 110, and a display content according to a display instruction, on the supporter 160.

A storage medium 240 can be load into the drive device 232. In this case, the storage medium 240 is the same as the storage medium 210 described above.

In the case of the supporter terminal 130, the various programs installed in the auxiliary storage device 223 are installed by loading the distributed storage medium 240 into the drive device 232, and reading the various programs by the drive device 232, for example. Alternatively, the various programs installed in the auxiliary storage device 223 may be installed by being downloaded from the network 140 via the communication device 224.

Functional Configuration of Worker Terminal

Figure 3:
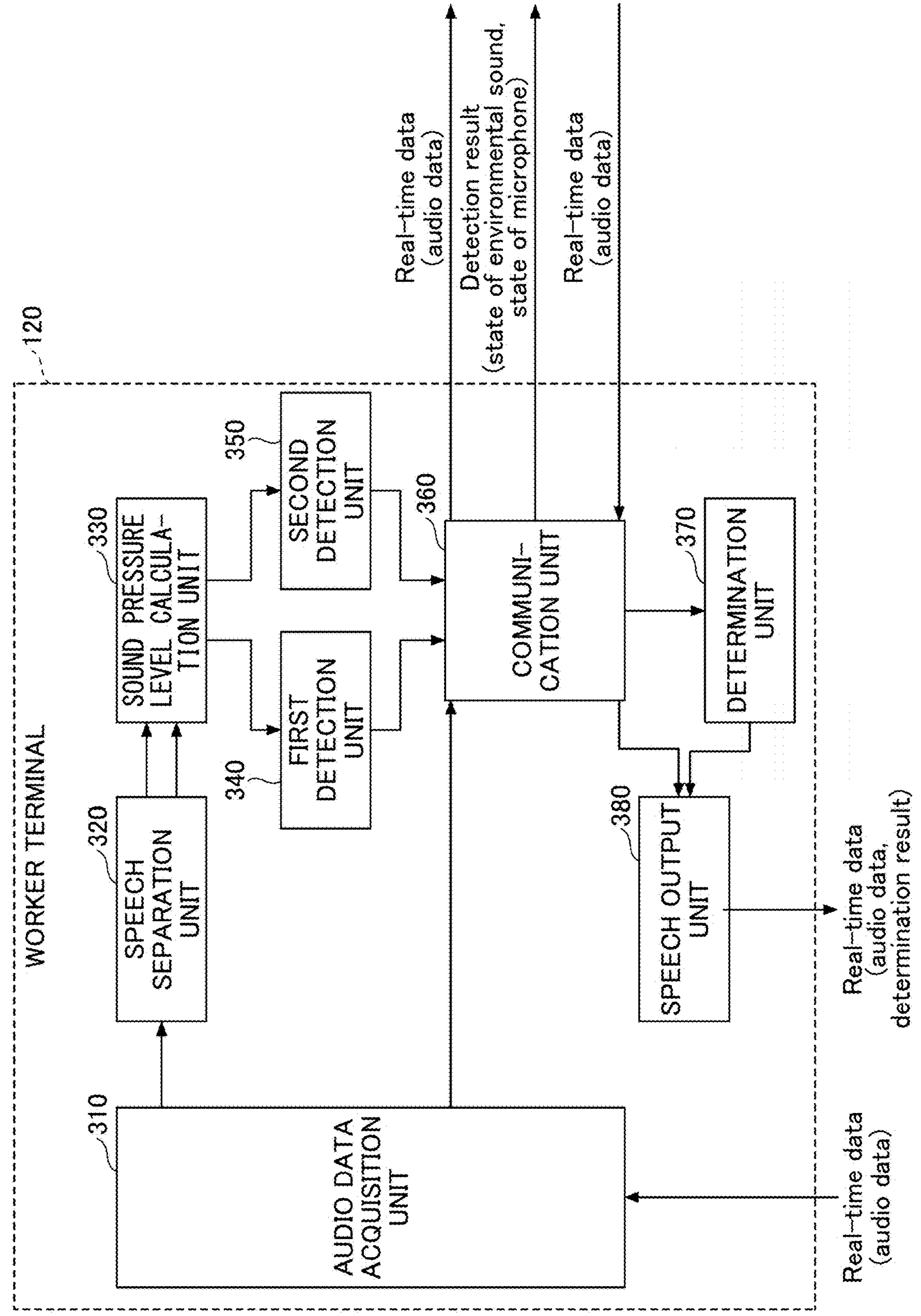
FIG. 3 is a first diagram illustrating an example of a functional configuration of the worker terminal.

Next, a functional configuration of the worker terminal 120 will be described. FIG. 3 is a first diagram illustrating an example of the functional configuration of the worker terminal. As described above, the client program is installed in the worker terminal 120. The worker terminal 120 functions as an audio data acquisition unit 310, a speech separation unit 320, a sound pressure level calculation unit 330, a first detection unit 340, a second detection unit 350, a communication unit 360, a determination unit 370, and a speech output unit 380 as illustrated in FIG. 3, by executing the client program. In the example illustrated in FIG. 3, functions related to processing of the video data are omitted for the sake of convenience, and only functions related to processing of audio data are extracted and illustrated (hereinafter, the processing of the audio data will be described).

The audio data acquisition unit 310 acquires the audio data detected by the speech acquisition device 227, and notifies the speech separation unit 320 and the communication unit 360 of the audio data.

The speech separation unit 320 separates the audio data notified from the audio data acquisition unit 310 into speech data based on the speech of the worker 150, and environmental audio data (audio data other than the speech data) based on the environmental sound around the speech acquisition device 227. The speech separation unit 320 notifies the sound pressure level calculation unit 330 of the separated speech data and the environmental audio data.

The sound pressure level calculation unit 330 calculates a magnitude (a sound pressure level) of the speech data notified from the speech separation unit 320, and notifies the second detection unit 350 of the magnitude of the speech data. In addition, the sound pressure level calculation unit 330 calculates the magnitude (the sound pressure level) of the environmental audio data notified from the speech separation unit 320, and notifies the first detection unit 340 and the second detection unit 350 of the calculated magnitude of the environmental audio data.

The first detection unit 340 detects a state of the environmental sound by determining whether or not the sound pressure level of the environmental audio data notified from the sound pressure level calculation unit 330 is greater than or equal to a predetermined threshold value. Specifically, in a case where the first detection unit 340 determines that the sound pressure level of the environmental audio data is greater than or equal to the predetermined threshold value, the first detection unit 340 detects that a presence of an influence of the environmental sound.

On the other hand, in a case where the first detection unit 340 determines that the sound pressure level of the environmental audio data is less than the predetermined threshold value, the first detection unit 340 detects that there is no influence of the environmental sound. Further, the first detection unit 340 notifies the communication unit 360 of the state of the environmental sound (the presence of the influence of the environmental sound, or no influence of the environmental sound), as a detection result.

The second detection unit 350 detects a state of the speech acquisition device 227 (a state of the microphone), by determining whether or not both the sound pressure level of the environmental audio data and the sound pressure level of the speech data notified from the sound pressure level calculation unit 330 are less than a predetermined threshold value. Specifically, the second detection unit 350 detects a malfunction of the speech acquisition device 227 (an abnormality of the microphone) in a case where the second detection unit 350 determines that both of the sound pressure levels of the environmental audio data and the speech data are less than the predetermined threshold value. On the other hand, in a case where the second detection unit 350 determines that one of the sound pressure levels of the environmental audio data and the speech data is greater than or equal to the predetermined threshold value, the second detection unit 350 detects no malfunction of the speech acquisition device 227 (a normal operating state of the microphone). Further, the second detection unit 350 notifies the communication unit 360 of the state of the microphone (the abnormality of the microphone, or the normal operating state of the microphone), as a detection result.

The communication unit 360 transmits the audio data notified from the audio data acquisition unit 310 to the server apparatus 110, and transmits the state of the environmental sound (the presence of the influence of the environmental sound, or no influence of the environmental sound) and the state of the microphone (the abnormality of the microphone, or the normal operating state of the microphone) to the server apparatus 110, as a detection result.

In addition, the communication unit 360 detects a communication state between the worker terminal 120 and the server apparatus 110. Specifically, the communication unit 360 detects a deterioration of the communication in a case where the communication connection between the worker terminal 120 and the server apparatus 110 is disconnected (in a case where the audio data is not transmitted from the server apparatus 110 for a certain period of time). Further, the communication unit 360 detects a normal communication in a case where the communication connection between the worker terminal 120 and the server apparatus 110 is continued (in a case where the audio data is transmitted from the server apparatus 110).

Moreover, the communication unit 360 notifies the determination unit 370 of the state of the environmental sound (the presence of the influence of the environmental sound, or no influence of the environmental sound), the state of the microphone (the abnormality of the microphone, or the normal operating state of the microphone), and the communication state (the deteriorated communication, or the normal communication), as a detection result.

Further, the communication unit 360 receives the audio data from the server apparatus 110, and notifies the speech output unit 380 of the audio data.

The determination unit 370 determines:

Whether or not the speech data based on the speech of the worker 150 being acquired by the worker terminal 120 can be converted into text data; or Whether or not a quality of the converted text data obtained by converting the speech data based on the speech of the worker 150 being acquired by the worker terminal 120 deteriorates, based on the detection result notified from the communication unit 360.

Specifically, in a case where the determination unit 370 is notified of the presence of the influence of the environmental sound, the determination unit 370 determines that the speech data based on the speech of the worker 150 cannot be converted into the text data, or that the quality of the converted text data deteriorates, due to the influence of the environmental sound.

In addition, in the case where the determination unit 370 is notified of the abnormality of the microphone, the determination unit 370 determines that the speech data based on the speech of the worker 150 cannot be converted into the text data, or that the quality of the converted text data deteriorates, due to the malfunction of the speech acquisition device 227.

Moreover, in the case where the determination unit 370 is notified of the deterioration of the communication, the determination unit 370 determines that the speech data based on the speech of the worker 150 cannot be converted into the text data, or that the quality of the converted text data deteriorates, due to the deterioration of the communication.

In addition, in the case where the determination unit 370 is notified of no influence of the environmental sound, the normal operating state of the microphone, or the normal communication, the determination unit 370 determines that the speech data based on the speech of the worker 150 can be converted into the text data, or that the quality of the converted text data does not deteriorate.

The speech output unit 380 outputs the audio data notified from the communication unit 360 to the worker 150 via the speech output device 228. Moreover, the speech output unit 380 notifies the worker 150 of the determination result notified from the determination unit 370 via the speech output device 228. Thus, the worker 150 can recognize that a situation unsuitable for speech recognition of the speech content of the worker 150 occurred, and the cause thereof. As a result, the worker 150 can immediately take measures according to the cause, thus making it possible to avoid a situation in which it is found later that a portion of the speech content is not appropriately converted into the text data.

Details of Functional Configuration of Server Apparatus

Next, a functional configuration of the server apparatus 110 will be described in detail. As described above, the server apparatus 110 has the bidirectional communication program installed therein, and functions as the bidirectional communication unit 111 and the text data management unit 112 by executing the bidirectional communication program.

Figure 4:
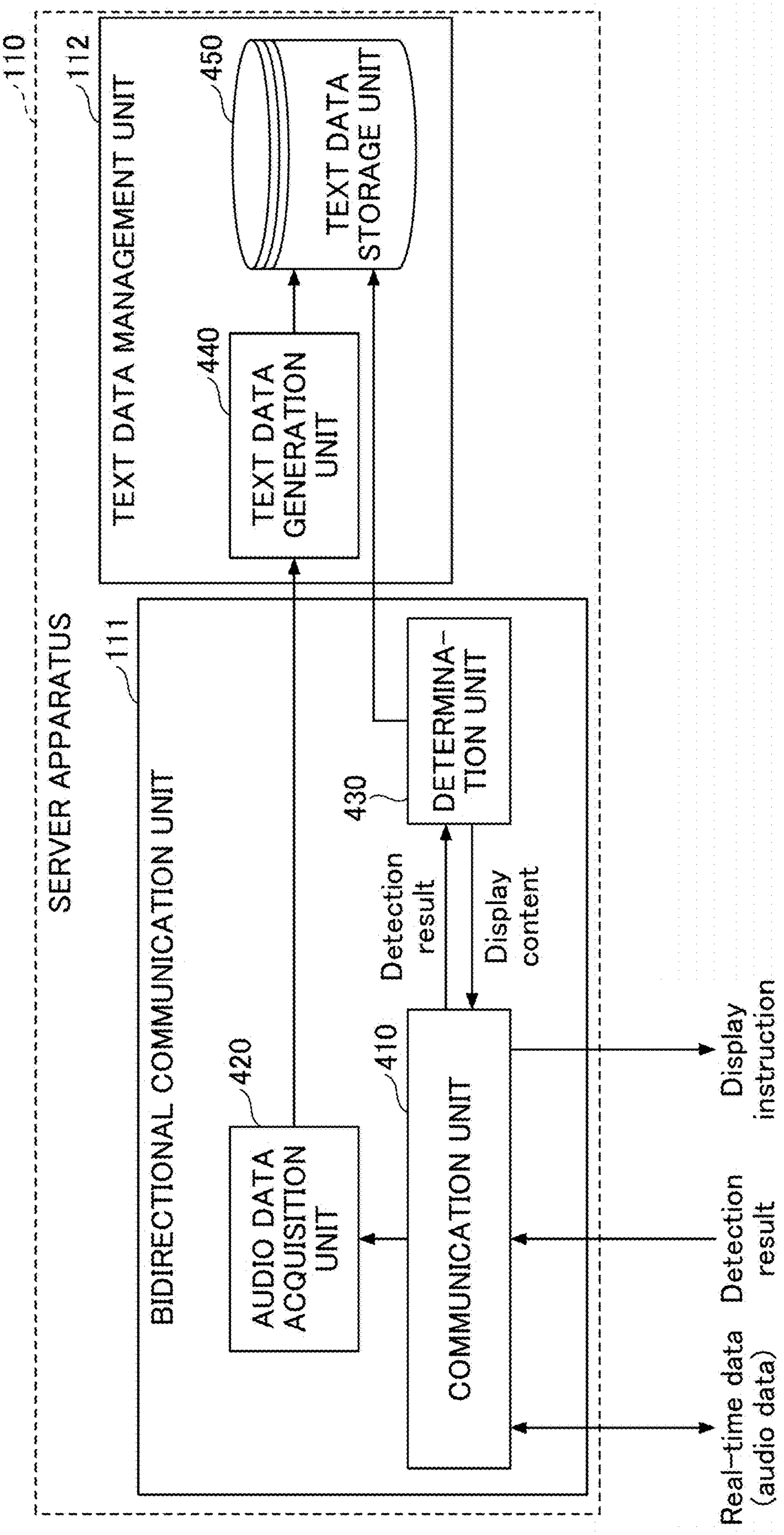
FIG. 4 is a first diagram illustrating an example of the details of the functional configuration of the server apparatus.

FIG. 4 is a first diagram illustrating an example of the details of the functional configuration of the server apparatus. As illustrated in FIG. 4, the bidirectional communication unit 111 further includes a communication unit 410, a speech data acquisition unit 420, and a determination unit 430. In addition, the text data management unit 112 further includes a text data generation unit 440.

The communication unit 410 receives the audio data transmitted from the worker terminal 120, transmits the audio data to the supporter terminal 130, and notifies the speech data acquisition unit 420 of the audio data. In addition, the communication unit 410 receives the audio data transmitted from the supporter terminal 130, transmits the audio data to the worker terminal 120, and notifies the speech data acquisition unit 420 of the audio data.

The communication unit 410 receives the detection result (the state of the environmental sound and the state of the microphone) transmitted from the worker terminal 120 and the detection result (the state of the environmental sound and the state of the microphone) transmitted from the supporter terminal 130, and notifies the determination unit 430 of the detection results.

The communication unit 410 detects a communication state between the worker terminal 120 and the server apparatus 110. Specifically, the communication unit 360 detects the deterioration of the communication in a case where the communication connection between the worker terminal 120 and the server apparatus 110 is disconnected (in a case where the audio data is not transmitted from the worker terminal 120 for a certain period of time). In addition, the communication unit 360 detects a normal communication in a case where the communication connection between the worker terminal 120 and the server apparatus 110 is continued (in a case where the audio data is transmitted from the worker terminal 120). Moreover, the communication unit 410 notifies the determination unit 430 of the communication state (the deteriorated communication, or the normal communication), as the detection result.

Similarly, the communication unit 410 detects a communication state between the supporter terminal 130 and the server apparatus 110. Specifically, the communication unit 410 detects the deterioration of the communication in a case where the communication connection between the supporter terminal 130 and the server apparatus 110 is disconnected (in a case where the audio data is not transmitted from the supporter terminal 130 for a certain period of time). In addition, the communication unit 410 detects that the communication is normal in a case where the communication connection between the supporter terminal 130 and the server apparatus 110 is continued. Moreover, the communication unit 410 notifies the determination unit 430 of the communication state (the deteriorated communication, or the normal communication), as a detection result.

Further, the communication unit 410 transmits a display instruction including a display content (the state of the environmental sound, the state of the microphone, and the communication state) notified from the determination unit 430 to the supporter terminal 130, in response to the notification of the detection result (the state of the environmental sound, the state of the microphone, and the communication state) for the worker terminal 120. In addition, the communication unit 410 transmits a display instruction including a display content (the state of the environmental sound and the state of the microphone) notified from the determination unit 430 to the supporter terminal 130, in response to the notification of the detection result (the state of the environmental sound, the state of the microphone, and the communication state) for the supporter terminal 130.

The speech data acquisition unit 420 acquires the speech data from the audio data notified from the communication unit 410, and notifies the text data generation unit 440 of the text data management unit 112 of the speech data.

The determination unit 430 determines:

Whether or not the speech data based on the speech of the worker 150 being acquired by the worker terminal 120 can be converted into the text data; or Whether or not the quality of the converted text data after the conversion of the speech data based on the speech of the worker 150 being acquired by the worker terminal 120 deteriorates, based on the detection result (the state of the environmental sound, the state of the microphone, and the communication state) for the worker terminal 120 notified from the communication unit 410, and determines the display content (the state of the environmental sound, the state of the microphone, and the communication state) according to the determination result.

Specifically, in the case where the determination unit 430 is notified of the presence of the influence of the environmental sound, the determination unit 430 determines that the speech data based on the speech of the worker 150 cannot be converted into the text data, or the quality of the converted text data after the conversion deteriorates, due to the influence of the environmental sound. Further, the determination unit 430 determines the display content (the state of the environmental sound) according to the determination result.

In addition, in the case where the determination unit 430 is notified of the abnormality of the microphone, the determination unit 430 determines that the speech data based on the speech of the worker 150 cannot be converted into the text data, or that the quality of the converted text data after the conversion deteriorates, due to a malfunction of the speech acquisition device 227. Moreover, the determination unit 430 determines the display content (the state of the microphone) according to the determination result.

In addition, in the case where the determination unit 430 is notified of the deterioration of the communication, the determination unit 430 determines that the speech data based on the speech of the worker 150 cannot be converted into the text data, or that the quality of the converted text data after the conversion deteriorates, due to the deterioration of the communication. Further, the determination unit 430 determines the display content (the communication state) according to the determination result.

Moreover, in the case where the determination unit 430 is notified of no influence of the environmental sound, the normal operating state of the microphone, and the normal communication state, the determination unit 430 determines that the speech data based on the speech of the worker 150 can be converted into the text data, or that the quality of the converted text data after the conversion does not deteriorate. Further, the determination unit 430 determines the display content (the state of the environmental sound, the state of the microphone, and the communication state) according to the determination result.

Similarly, the determination unit 430 determines:

Whether or not the speech data based on the speech of the supporter 160 being acquired by the supporter terminal 130 can be converted into text data; or Whether or not the quality of the converted text data obtained by converting the speech data based on the speech of the supporter 160 being acquired by the supporter terminal 130 deteriorates, based on the detection result (the state of the environmental sound, the state of the microphone, and the communication state) for the supporter terminal 130 notified from the communication unit 410, and determines the display content (the state of the environmental sound and the state of the microphone) according to the determination result.

Specifically, in the case where the determination unit 430 is notified of the presence of the influence of the environmental sound, the determination unit 430 determines that the speech data based on the speech of the supporter 160 cannot be converted into the text data, or that the quality of the converted text data after the conversion deteriorates, due to the influence of the environmental sound. Moreover, the determination unit 430 determines the display content (the state of the environmental sound) according to the determination result.

In addition, in the case where the determination unit 430 is notified of the abnormality of the microphone, the determination unit 430 determines that the speech data based on the speech of the supporter 160 cannot be converted into the text data, or that the quality of the converted text data after the conversion deteriorates, due to the malfunction of the speech acquisition device 227. Further, the determination unit 430 determines the display content (the state of the microphone) according to the determination result.

Moreover, in the case where the determination unit 430 is notified of the deterioration of the communication, the determination unit 430 determines that the speech data based on the speech of the worker 150 cannot be converted into the text data, or that the quality of the converted text data after the conversion deteriorates, due to the deterioration of the communication.

In addition, in the case where the determination unit 430 is notified of no influence of the environmental sound, the normal operating state of the microphone, and the normal communication, the determination unit 430 determines that the speech data based on the speech of the supporter 160 can be converted into the text data, or that the quality of the converted text data after the conversion does not deteriorate. Further, the determination unit 430 determines the display content (the state of the environmental sound and the state of the microphone) according to the determination result.

Further, the determination unit 430 stores the determination result in the text data storage unit 450 in association with text data which will be described below.

The text data generation unit 440 performs a speech recognition on the speech data notified from the speech data acquisition unit 420, and converts the speech data into text data. In addition, the text data generation unit 440 stores the converted text data in the text data storage unit 450 in association with the determination result.

Functional Configuration of Supporter Terminal

Figure 5:
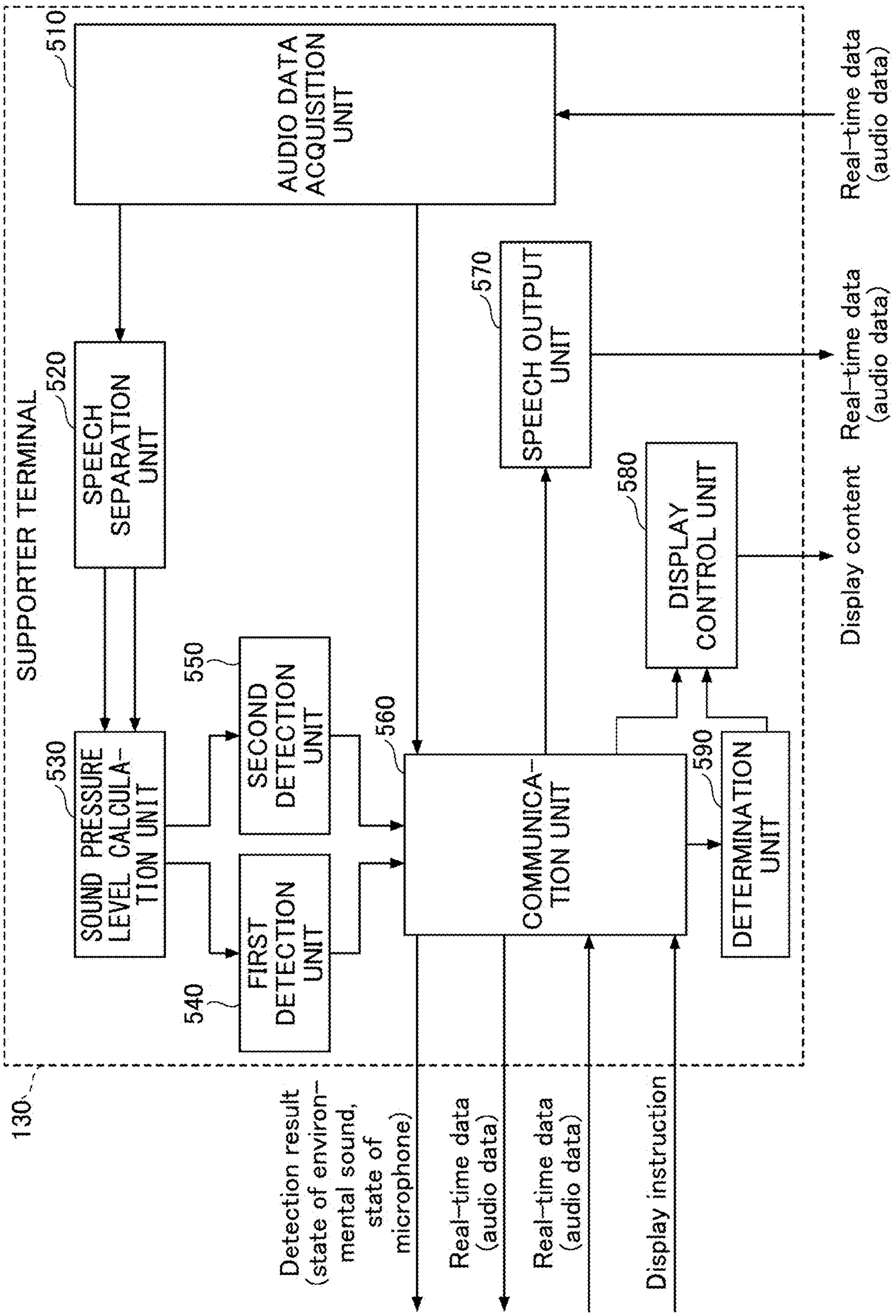
FIG. 5 is a first diagram illustrating an example of a functional configuration of a supporter terminal.

Next, a functional configuration of the supporter terminal 130 will be described. FIG. 5 is a first diagram illustrating an example of the functional configuration of the supporter terminal. As described above, the client program is installed in the supporter terminal 130. The supporter terminal 130 functions as an audio data acquisition unit 510, a speech separation unit 520, a sound pressure level calculation unit 530, a first detection unit 540, a second detection unit 550, and a communication unit 560 illustrated in FIG. 5, by executing the client program. In addition, the supporter terminal 130 functions as a speech output unit 570, a display control unit 580, and a determination unit 590.

The audio data acquisition unit 510 acquires the audio data detected by the speech acquisition device 227, and notifies the speech separation unit 520 and the communication unit 560 of the audio data.

The speech separation unit 520 separates the audio data notified from the audio data acquisition unit 510 into the speech data based on the speech of the supporter 160 and environmental audio data (audio data other than the speech data) based on the environmental sound around the speech acquisition device 227. In addition, the speech separation unit 520 notifies the sound pressure level calculation unit 530 of the separated speech data and environmental audio data.

The sound pressure level calculation unit 530 calculates the sound pressure level of the speech data notified from the speech separation unit 520, and notifies the second detection unit 550 of the calculated sound pressure level. In addition, the sound pressure level calculation unit 530 calculates the sound pressure level of the environmental audio data notified from the speech separation unit 520, and notifies the first detection unit 540 and the second detection unit 550 of the calculated sound pressure level.

The first detection unit 540 detects the state of the environmental sound, by determining whether or not the sound pressure level of the environmental audio data notified from the sound pressure level calculation unit 530 is greater than or equal to a predetermined threshold value. Specifically, in the case where the first detection unit 540 determines that the sound pressure level of the environmental audio data is greater than or equal to the predetermined threshold value, the first detection unit 540 detects the presence of the influence of the environmental sound.

On the other hand, in the case where the first detection unit 540 determines that the sound pressure level of the environmental audio data is less than the predetermined threshold value, the first detection unit 540 detects that there is no influence of the environmental sound. Further, the first detection unit 540 notifies the communication unit 560 of the state of the environmental sound (the presence of the influence of the environmental sound, or no influence of the environmental sound), as a detection result.

The second detection unit 550 detects the state of the speech acquisition device 227 (the state of the microphone), by determining whether or not both the sound pressure level of the environmental audio data and the sound pressure level of the speech data notified from the sound pressure level calculation unit 530 are less than a predetermined threshold value. Specifically, in the case where the second detection unit 550 determines that both of the sound pressure levels are less than the predetermined threshold value, the second detection unit 550 detects a malfunction of the speech acquisition device 227 (the abnormality of the microphone). On the other hand, in the case where the second detection unit 550 determines that one of the sound pressure levels is greater than or equal to the predetermined threshold value, the second detection unit 550 detects no malfunction of the speech acquisition device 227 (the microphone is normal). Further, the second detection unit 550 notifies the communication unit 560 of the state of the microphone (the abnormality of the microphone, or the normal operating state of the microphone), as a detection result.

The communication unit 560 transmits the audio data notified from the audio data acquisition unit 510 to the server apparatus 110, and transmits the state of the environmental sound (the presence of the influence of the environmental sound, or no influence of the environmental sound) and the state of the microphone (the abnormality of the microphone, or the normal operating state of the microphone) to the server apparatus 110, as a detection result.

In addition, the communication unit 560 detects a communication state between the supporter terminal 130 and the server apparatus 110. Specifically, in a case where the communication connection between the supporter terminal 130 and the server apparatus 110 is disconnected (in a case where the audio data is not transmitted from the server apparatus 110 for a certain period of time), the communication unit 560 detects a deterioration of the communication. In addition, in a case where the communication connection between the supporter terminal 130 and the server apparatus 110 is continued (in a case where the audio data is transmitted from the server apparatus 110), the communication unit 560 detects a normal communication.

The communication unit 560 notifies the determination unit 590 of the communication state (the deteriorated communication, or the normal communication), as a detection result.

The communication unit 560 receives the audio data from the server apparatus 110, and notifies the speech output unit 570 of the audio data.

Further, the communication unit 560 receives a display instruction from the server apparatus 110, and notifies the display control unit 580 of the display instruction. The display instruction received by the communication unit 560 includes:

A display instruction corresponding to the detection result (the state of the environmental sound, the state of the microphone, and the communication state) for the worker terminal 120; and A display instruction corresponding to the detection result (the state of the environmental sound, and the state of the microphone) for the supporter terminal 130.

The speech output unit 570 outputs the audio data notified from the communication unit 560 to the supporter 160, via the speech output device 228.

The determination unit 590 determines:

Whether or not the speech data based on the speech of the worker 150 being acquired by the worker terminal 120 can be converted into the text data; or Whether or not the quality of the converted text data obtained by converting the speech data based on the speech of the worker 150 being acquired by the worker terminal 120 deteriorates, based on the communication state (the deteriorated communication, or the normal communication) notified from the communication unit 410 as the detection result, and determines the display content (the communication state) according to the determination result. In addition, the determination unit 590 notifies the display control unit 580 of a display instruction including the determined display content (the communication state).

The display control unit 580 displays the display instruction notified from the communication unit 560 and the display content included in the display instruction notified from the determination unit 590 on the display device 231 of the supporter terminal 130.

Flow Chart of Communication Process (1)

Figure 6:
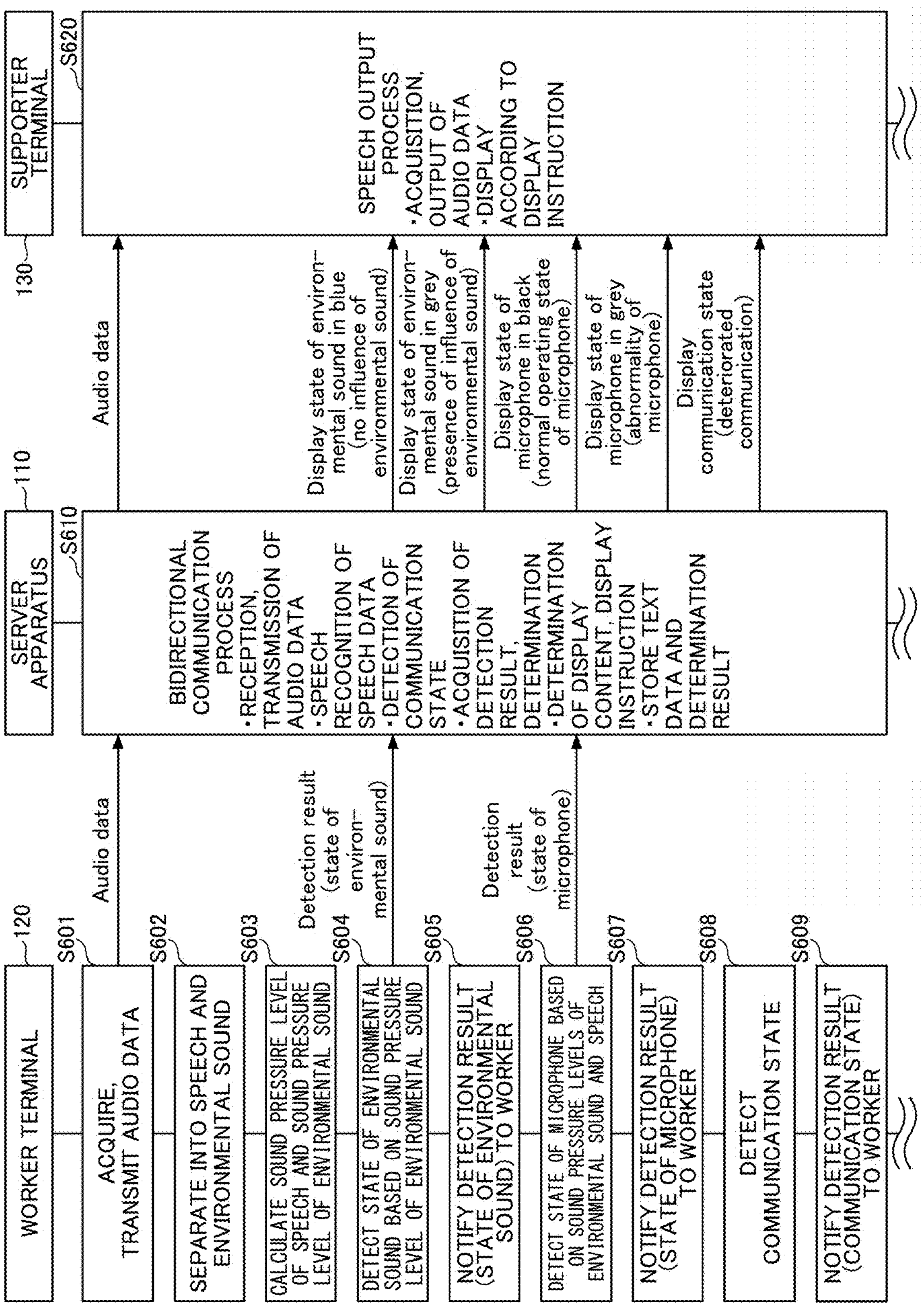
FIG. 6 is a first sequence diagram illustrating a flow chart of a communication process for a case where the worker terminal transmits audio data to the supporter terminal in the bidirectional communication system.

Next, a flow chart of a communication process performed by the bidirectional communication system 100 will be described for a case where the audio data including the speech data based on the speech of the worker 150 is transmitted from the worker terminal 120 to the supporter terminal 130. FIG. 6 is a first sequence diagram illustrating the flow chart of the communication process for the case where the audio data is transmitted from the worker terminal to the supporter terminal in the bidirectional communication system.

In step S601, the worker terminal 120 acquires the audio data including the speech data based on the speech of the worker 150. In addition, the worker terminal 120 transmits the acquired audio data to the server apparatus 110.

In step S610, the server apparatus 110 performs a bidirectional communication process. The bidirectional communication process performed by the server apparatus 110 includes an audio data reception and transmission process, a speech recognition process on the speech data, a communication state detection process, an acquisition and determination process on the detection result, a determination and display instruction process of the display content, and a storage process of the text data and the determination result. In this example, the server apparatus 110 receives the audio data, and transmits the audio data to the supporter terminal 130. Moreover, the server apparatus 110 performs the speech recognition process on the speech data to convert the speech data into the text data.

In step S620, the supporter terminal 130 performs a speech output process. The speech output process performed by the supporter terminal 130 includes a process of acquiring and outputting the audio data, and a display process in response to a display instruction. In this example, the supporter terminal 130 acquires and outputs the audio data.

In step S602, the worker terminal 120 separates the audio data into the speech data and the environmental sound data.

In step S603, the worker terminal 120 calculates the sound pressure level of the audio data and the sound pressure level of the environmental sound data.

In step S604, the worker terminal 120 detects the state of the environmental sound, based on the sound pressure level of the environmental sound data. Further, the worker terminal 120 transmits the detection result (the state of the environmental sound) to the server apparatus 110.

In step S610, the server apparatus 110 performs a bidirectional communication process. In this example, the server apparatus 110 receives the detection result (the state of the environmental sound), performs a determination based on the received detection result (the state of the environmental sound), determines a display content (the state of the environmental sound), and transmits a display instruction according to the determined display content to the supporter terminal 130.

In a case where the server apparatus 110 receives the detection result indicating that there is no influence of the environmental sound, the server apparatus 110 determines that the speech data based on the speech of the worker 150 can be converted into the text data, or that the quality of the converted text data after the conversion does not deteriorate. In this case, the server apparatus 110 instructs the supporter terminal 130 to display an icon indicating the state of the environmental sound in blue, for example.

In addition, in a case where the server apparatus 110 receives the detection result indicating the presence of the influence of the environmental sound, the server apparatus 110 determines that the speech data based on the speech of the worker 150 cannot be converted into the text data, or that the quality of the converted text data after the conversion deteriorates, due to the influence of the environmental sound. In this case, the server apparatus 110 instructs the supporter terminal 130 to display an icon indicating the state of the environmental sound in gray, for example.

In step S620, the supporter terminal 130 performs a speech output process. In this example, the supporter terminal 130 performs a display process according to the display instruction. The supporter terminal 130 displays an icon indicating the state of the environmental sound of the worker terminal 120 in blue, for example. Alternatively, the supporter terminal 130 displays an icon indicating the state of the environmental sound of the worker terminal 120 in gray.

In step S605, in a case where the detection result in step S604 indicates "the presence of the influence of the environmental sound", the worker terminal 120 notifies the worker 150 of the determination result. Specifically, the worker terminal 120 notifies the worker 150 of a determination result indicating that the speech data based on the speech of the worker 150 cannot be converted into the text data, or that the quality of the converted text data after the conversion deteriorates, due to the influence of the environmental sound.

In step S606, the worker terminal 120 detects the state of the microphone, based on the sound pressure level of the environmental sound and the sound pressure level of the speech data. The worker terminal 120 transmits a detection result (the state of the microphone) to the server apparatus 110.

In step S610, the server apparatus 110 performs a bidirectional communication process. In this example, the server apparatus 110 receives the detection result (the state of the microphone), performs a determination based on the received detection result (the state of the microphone), determines the display content (the state of the microphone), and transmits a display instruction according to the determined display content to the supporter terminal 130.

In a case where the server apparatus 110 receives the detection result indicating the normal operating state of the microphone, the server apparatus 110 determines that the speech data based on the speech of the worker 150 can be converted into the text data, or that the quality of the converted text data after the conversion does not deteriorate. In this case, the server apparatus 110 instructs the supporter terminal 130 to display an icon indicating the state of the microphone in black, for example.

In addition, in a case where the server apparatus 110 receives the detection result indicating the abnormality of the microphone, the server apparatus 110 determines that the speech data based on the speech of the worker 150 cannot be converted into the text data, or that the quality of the converted text data after the conversion deteriorates, due to the malfunction of the speech acquisition device 227. In this case, the server apparatus 110 instructs the supporter terminal 130 to display an icon indicating the state of the microphone in gray, for example.

In step S620, the supporter terminal 130 performs a speech output process. In this example, the supporter terminal 130 performs a display process according to the display instruction. The supporter terminal 130 displays an icon indicating the state of the microphone of the worker terminal 120 in black, for example. Alternatively, the supporter terminal 130 displays an icon indicating the state of the microphone of the worker terminal 120 in gray.

In step S607, in a case where the detection result in step S606 indicates "the abnormality of the microphone", the worker terminal 120 notifies the worker 150 of the determination result. Specifically, the worker terminal 120 notifies the worker 150 of the determination result indicating that the speech data based on the speech of the worker 150 cannot be converted into the text data, or that the quality of the converted text data after the conversion deteriorates, due to the malfunction of the speech acquisition device 227.

In step S608, the worker terminal 120 detects a communication state. In addition, in step S609, in a case where the detection result in step S608 indicates "the deterioration of the communication", the worker terminal 120 notifies the worker 150 of the determination result. Specifically, the worker terminal 120 notifies the worker 150 of the determination result indicating that the speech data based on the speech of the worker 150 cannot be converted into the text data, or the quality of the converted text data after the conversion deteriorates, due to the deterioration of communication.

In step S610, the server apparatus 110 executes a bidirectional communication process. In this example, the server apparatus 110 detects a communication state, performs a determination based on the detection result (the communication state), determines a display content (the communication state), and transmits a display instruction according to the determined display content to the supporter terminal 130.

In a case where the server apparatus 110 acquires the detection result indicating the deterioration of the communication, the server apparatus 110 determines that the speech data based on the speech of the worker 150 cannot be converted into the text data, or the quality of the converted text data after the conversion deteriorates, due to the deterioration of the communication. In this case, the server apparatus 110 instructs the supporter terminal 130 to display an icon indicating the communication state, for example.

In step S620, the supporter terminal 130 performs a speech output process. In this example, the supporter terminal 130 performs a display process according to the display instruction. For example, an icon indicating the communication state between the worker terminal 120 and the server apparatus 110 is displayed.

In step S610, the server apparatus 110 performs a bidirectional communication process. In this example, the server apparatus 110 stores the converted text data and the determination result in association with each other.

The communication process illustrated in FIG. 6 is repeatedly performed while the worker 150 and the supporter 160 continue the communication using the bidirectional communication system 100.

Flow Chart of Communication Process (2)

Figure 7:
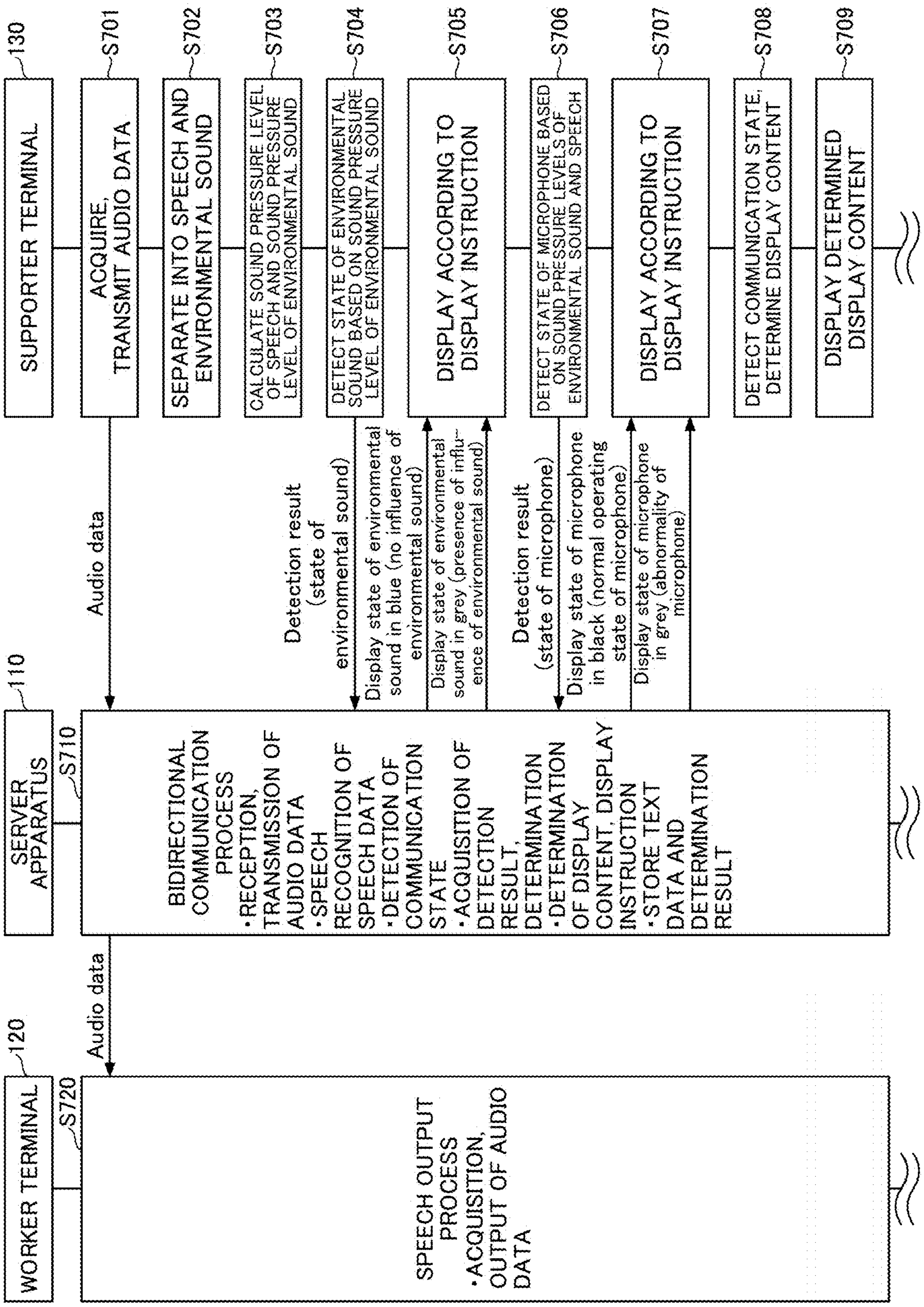
FIG. 7 is a first sequence diagram illustrating a flow chart of a communication process for a case where the supporter terminal transmits audio data to the worker terminal in the bidirectional communication system.

Next, a flow chart of a communication process performed by the bidirectional communication system 100 will be described for a case where the audio data including the speech data based on the speech of the supporter 160 is transmitted from the supporter terminal 130 to the worker terminal 120. FIG. 7 is a first sequence diagram illustrating the flow chart of the communication process for the case where the audio data is transmitted from the supporter terminal to the worker terminal in the bidirectional communication system.

In step S701, the supporter terminal 130 acquires the audio data including the speech data based on the speech of the supporter 160. In addition, the supporter terminal 130 transmits the acquired audio data to the server apparatus 110.

In step S710, the server apparatus 110 performs a bidirectional communication process. The bidirectional communication process of the server apparatus 110 includes an audio data reception and transmission process, a speech recognition process on the speech data, a communication state detection process, an acquisition and determination process on the detection result, a determination and display instruction process of the display content, and a storage process of the text data and the determination result. In this example, the server apparatus 110 receives the audio data, and transmits the audio data to the worker terminal 120. Further, the server apparatus 110 performs the speech recognition process on the speech data to convert the speech data into the text data.

In step S720, the worker terminal 120 performs a speech output process. The speech output process performed by the worker terminal 120 includes a process of acquiring and outputting the audio data. In this example, the worker terminal 120 acquires and outputs the audio data.

In step S702, the supporter terminal 130 separates the audio data into the speech data and the environmental sound data.

In step S703, the supporter terminal 130 calculates the sound pressure level of the audio data and the sound pressure level of the environmental sound data.

In step S704, the supporter terminal 130 detects the state of the environmental sound, based on the sound pressure level of the environmental sound data. The supporter terminal 130 transmits a detection result (the state of the environmental sound) to the server apparatus 110.

In step S710, the server apparatus 110 performs a bidirectional communication process. In this example, the server apparatus 110 receives the detection result (the state of the environmental sound), performs a determination based on the received detection result (the state of the environmental sound), determines a display content (the state of the environmental sound), and transmits a display instruction according to the determined display content to the supporter terminal 130.

In a case where the server apparatus 110 receives the detection result indicating that there is no influence of the environmental sound, the server apparatus 110 determines that the speech data based on the speech of the supporter 160 can be converted into text data, or that the quality of the converted text data after the conversion does not deteriorate. In this case, the server apparatus 110 instructs the supporter terminal 130 to display an icon indicating the state of the environmental sound in blue, for example.

In addition, in a case where the server apparatus 110 receives the detection result indicating the presence of the influence of the environmental sound, the server apparatus 110 determines that the speech data based on the speech of the supporter 160 cannot be converted into the text data, or that the quality of the converted text data after the conversion deteriorates, due to the influence of the environmental sound. In this case, the server apparatus 110 instructs the supporter terminal 130 to display an icon indicating the state of the environmental sound in gray, for example.

In step S705, the supporter terminal 130 performs a display process according to a display instruction from the server apparatus 110. The supporter terminal 130 displays an icon indicating the state of the environmental sound of the supporter terminal 130 in blue, for example. Alternatively, the supporter terminal 130 displays an icon indicating the state of the environmental sound of the supporter terminal 130 in gray.

In step S706, the supporter terminal 130 detects the state of the microphone, based on the sound pressure level of the environmental sound data and the sound pressure level of the speech data. Further, the supporter terminal 130 transmits the detection result (the state of the microphone) to the server apparatus 110.

In step S710, the server apparatus 110 performs a bidirectional communication process. In this example, the server apparatus 110 receives the detection result (the state of the microphone), performs a determination based on the received detection result (the state of the microphone), determines a display content (the state of the microphone), and transmits a display instruction according to the determined display content to the supporter terminal 130.

In a case where the server apparatus 110 receives the detection result indicating the normal operating state of the microphone, the server apparatus 110 determines that the speech data based on the speech of the supporter 160 can be converted into the text data. or that the quality of the converted text data after the conversion does not deteriorate. In this case, the server apparatus 110 instructs the supporter terminal 130 to display an icon indicating the state of the microphone in black, for example.

In addition, in a case where the server apparatus 110 receives the detection result indicating the abnormality of the microphone, the server apparatus 110 determines that the speech data based on the speech of the supporter 160 cannot be converted into the text data, or that the quality of the converted text data after the conversion deteriorates, due to the malfunction of the speech acquisition device 227. In this case, the server apparatus 110 instructs the supporter terminal 130 to display an icon indicating the state of the microphone in gray, for example.

In step S707, the supporter terminal 130 performs a display process according to the display instruction from the server apparatus 110. The supporter terminal 130 displays an icon indicating the state of the microphone of the supporter terminal 130 in black, for example. Alternatively, the supporter terminal 130 displays an icon indicating the state of the microphone of the supporter terminal 130 in gray.

In step S708, the supporter terminal 130 detects a communication state, performs a determination based on the detection result (the communication state), and determines a display content (the communication state).

In a case where the detection result indicates "the deterioration of the communication", the supporter terminal 130 determines that the speech data based on the speech of the supporter 160 cannot be converted into the text data, or that the quality of the converted text data after the conversion deteriorates, due to the deterioration of the communication. In this case, the supporter terminal 130 determines an icon indicating the communication state, for example, as the display content (the communication state).

In step S709, the supporter terminal 130 displays the determined display content. The supporter terminal 130 displays an icon indicating the communication state between the supporter terminal 130 and the server apparatus 110, for example.

In step S710, the server apparatus 110 performs a bidirectional communication process. In this example, the server apparatus 110 detects a communication state, and performs a determination based on the detection result (the communication state). Further, the server apparatus 110 stores the converted text data and the determination result in association with each other.

The communication process illustrated in FIG. 7 is performed repeatedly while the worker 150 and the supporter 160 continue the communication using the bidirectional communication system 100.

Display Screen Example of Supporter Terminal

Figure 8:
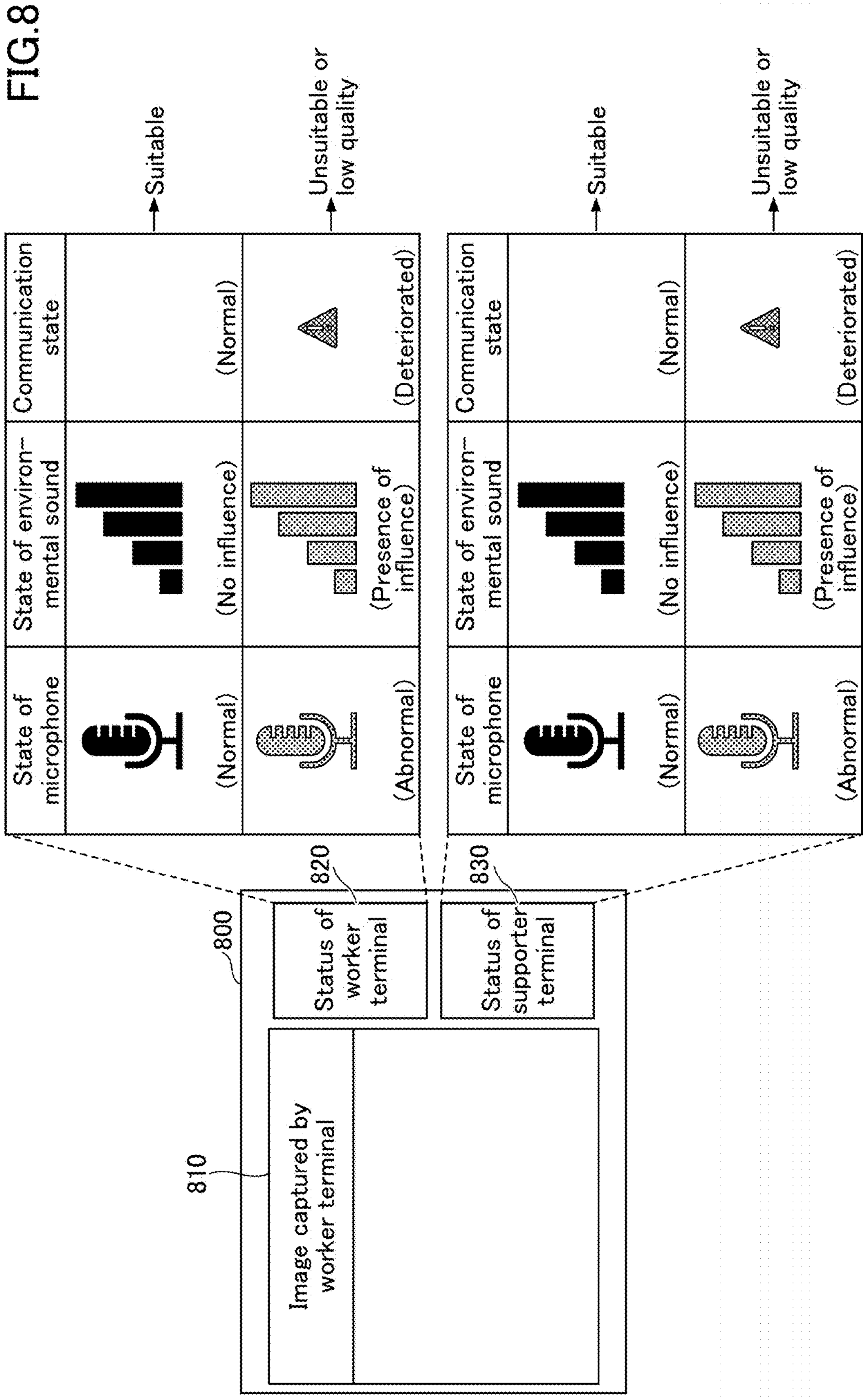
FIG. 8 is a diagram illustrating an example of a display screen of the supporter terminal.

Next, an example of a display screen displayed on the display device 231 of the supporter terminal 130 will be described. FIG. 8 is a diagram illustrating an example of a display screen of the supporter terminal. As illustrated in FIG. 8, a display screen 800 includes an area 810 in which the video data transmitted from the worker terminal 120 is displayed, an area 820 in which a status of the worker terminal 120 is displayed, and an area 830 in which a status of the supporter terminal 130 is displayed.

Among the areas of the display screen 800, the area 810 displays the video data captured by the imaging device 229 of the worker terminal 120 and transmitted by the communication device 224 of the worker terminal 120 during the bidirectional communication process.

In the area 820, "state of microphone", "environmental sound state", and "communication state" are displayed as the status of the worker terminal 120.

An icon indicating the state of the microphone of the worker terminal 120 is displayed in the "state of microphone". As illustrated in FIG. 8, in a case where the detection result (the state of the microphone) detected by the worker terminal 120 is "normal operating state of microphone", the icon indicating the state of the microphone is displayed in black. In addition, in a case where the detection result (the state of the microphone) detected by the worker terminal 120 is "abnormality of microphone", the icon indicating the state of the microphone is displayed in gray.

An icon indicating the state of the environmental sound of the worker terminal 120 is displayed in the "state of environmental sound". As illustrated in FIG. 8, in a case where the detection result (the state of the environmental sound) detected by the worker terminal 120 is "no influence of environmental sound", the icon indicating the state of the environmental sound is displayed in black. In addition, in a case where the detection result (the state of the environmental sound) detected by the worker terminal 120 is "presence of influence of environmental sound", the icon indicating the state of the environmental sound is displayed in blue.

An icon indicating the communication state between the worker terminal 120 and the server apparatus 110 is displayed in the "communication state". As illustrated in FIG. 8, in a case where the detection result (the communication state) detected by the server apparatus 110 is the "normal communication", no icon is displayed. On the other hand, in a case where the detection result (the communication state) detected by the server apparatus 110 indicates "deterioration of communication", an icon is displayed.

The supporter 160 refers to the area 820 while communicating with the worker 150, and can recognize:

- Whether or not the situation of the worker terminal 120 is suitable for performing the speech recognition on the speech data based on the speech of the worker 150; and
- Whether or not the situation unsuitable for the speech recognition occurred in the worker terminal 120.

In addition, when the supporter 160 recognizes that the situation unsuitable for the speech recognition of the speech data based on the speech of the worker 150 occurred in the worker terminal 120, the supporter 160 can understand the cause (the malfunction of the speech acquisition device 227, the presence of the influence of the environmental sound, or the deterioration of the communication). For this reason, the supporter 160 can prompt the worker 150 to improve the situation, and can avoid a situation in which it is found later that a portion of the speech content is not converted into appropriate text data.

Similarly, in the area 830, the "state of microphone", the "state of environmental state", and the "communication state" are displayed as the status of the supporter terminal 130.

An icon indicating the state of the microphone of the supporter terminal 130 is displayed in the "state of microphone". As illustrated in FIG. 8, in a case where the detection result (the state of the microphone) detected by the supporter terminal 130 is "normal operating state of microphone", the icon indicating the state of the microphone is displayed in black. In addition, in a case where the detection result (the state of the microphone) detected by the supporter terminal 130 is "abnormality of microphone", the icon indicating the state of the microphone is displayed in gray.

An icon indicating the state of the environmental sound of the supporter terminal 130 is displayed in the "state of environmental sound". As illustrated in FIG. 8, in a case where the detection result (the state of the environmental sound) detected by the supporter terminal 130 is "no influence of environmental sound", the icon indicating the state of the environmental sound is displayed in black. In addition, in a case where the detection result (the state of the environmental sound) detected by the supporter terminal 130 is "presence of influence of environmental sound", the icon indicating the state of the environmental sound is displayed in blue.

An icon indicating the communication state between the supporter terminal 130 and the server apparatus 110 is displayed in the "communication state". As illustrated in FIG. 8, in a case where the detection result (the communication state) detected by the supporter terminal 130 is "normal communication", the icon is not displayed. On the other hand, in a case where the detection result (the communication state) detected by the supporter terminal 130 indicates "deteriorated communication", an icon is displayed.

The supporter 160 refers to the area 830 while communicating with the worker 150, and can recognize:

- Whether or not the supporter terminal 130 is in a situation suitable for performing the speech recognition on the speech data based on the speech of the supporter 160; and
- Whether or not a situation unsuitable for the speech recognition of the speech of the supporter 160 occurred in the supporter terminal 130.

In addition, when the supporter 160 recognizes that a situation unsuitable for performing the speech recognition on the speech data based on the speech of the supporter 160 occurred in the supporter terminal 130, the supporter 160 can understand the cause (the malfunction of the speech acquisition device 227, the presence of the influence of the environmental sound, or the deterioration of the communication). For this reason, the supporter 160 can immediately improve the situation, and can avoid a situation in which it is found later that a portion of the speech content is not converted into appropriate text data.

Conclusion

As is clear from the description given heretofore, the bidirectional communication system 100, which is an example of the system according to the first embodiment, performs the following:

- During the acquisition of the audio data, sound pressure data of the audio data being acquired and sound pressure data of the environmental audio data other than the audio data are calculated. Thus, it can be determined whether or not the speech data being acquired can be converted into the text data, or whether or not the quality of the converted text data after the conversion of the speech data being acquired deteriorates.
- The determination result is notified to the worker, or the display content according to the determination result is displayed on the supporter terminal.

Hence, according to the bidirectional communication system 100, the worker or the supporter can recognize the occurrence of a situation unsuitable for the speech recognition.

Second Embodiment

In the first embodiment, the case where the process of converting the speech data into the text data is collectively performed in the server apparatus 110 is described. However, the process of converting the speech data in bulk into the text data may be performed in each client terminal of the worker terminal 120 and the supporter terminal 130. A second embodiment will be described below, focusing on the difference from the first embodiment.

Functional Configuration of Worker Terminal

Figure 9:
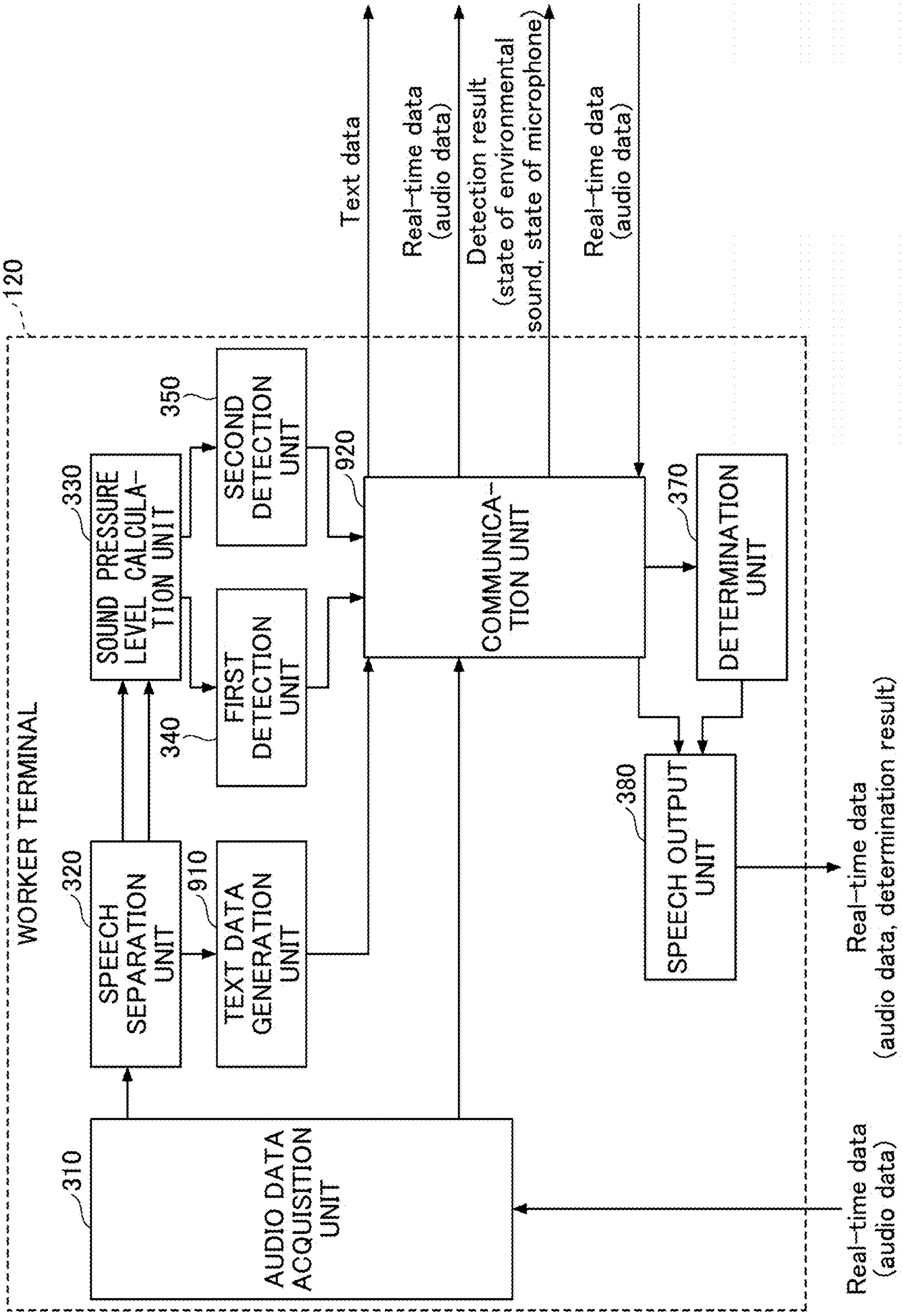
FIG. 9 is a second diagram illustrating an example of the functional configuration of the worker terminal.

First, the functional configuration of the worker terminal 120 according to the second embodiment will be described. FIG. 9 is a second diagram illustrating an example of the functional configuration of the worker terminal. The difference from the functional configuration of the first embodiment described with reference to FIG. 3 is that a text data generation unit 910 is provided, and functions of a communication unit 920 are different from the functions of the communication unit 360 illustrated in FIG. 3.

The text data generation unit 910 converts the speech data notified from the speech separation unit 320 into the text data by performing the speech recognition, and notifies the communication unit 920 of the converted text data.

The communication unit 920 has a function of transmitting the text data notified from the text data generation unit 910 to the server apparatus 110, in addition to the functions of the communication unit 360 illustrated in FIG. 3.

Details of Functional Configuration of Server Apparatus

Figure 10:
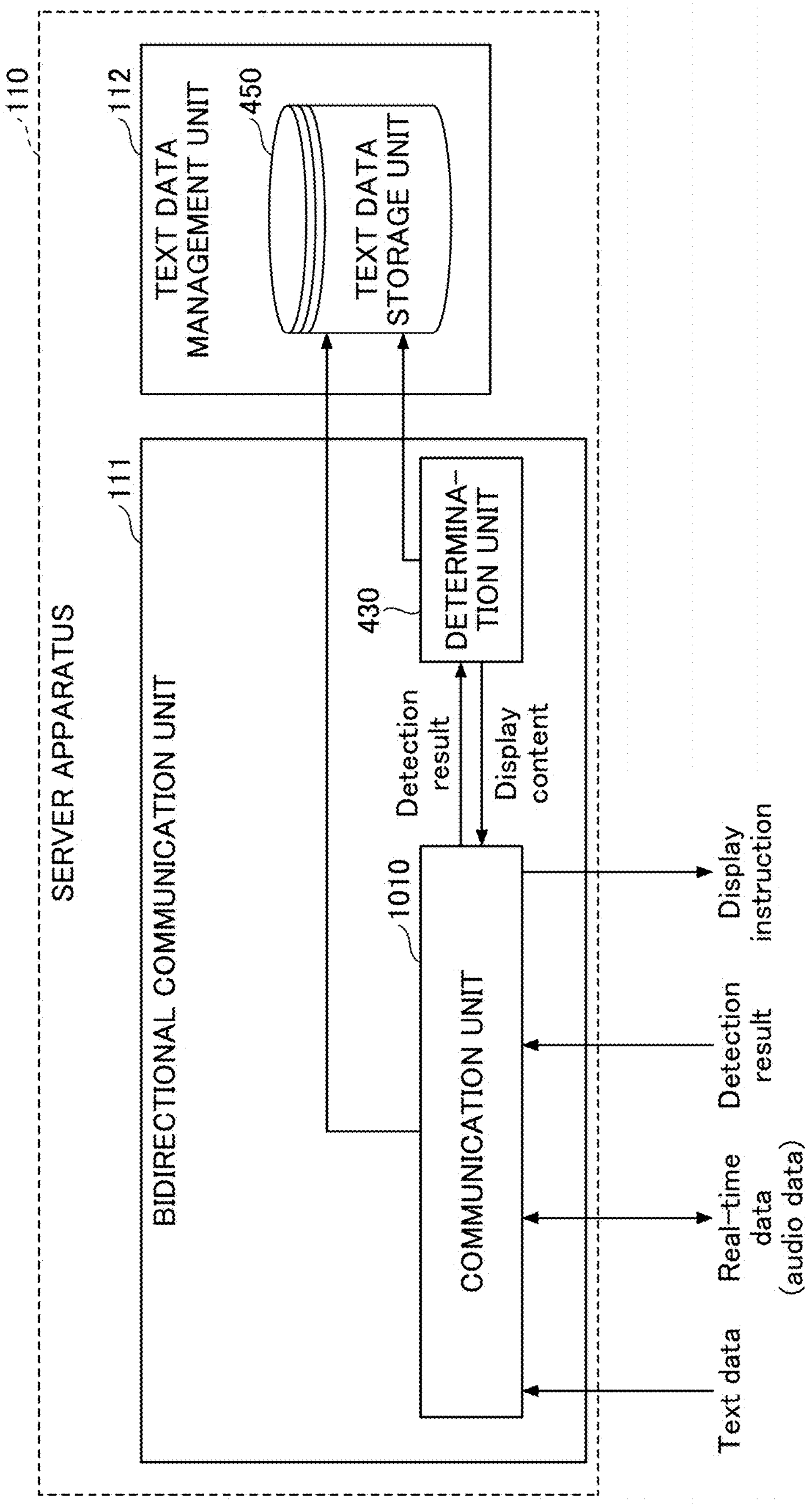
FIG. 10 is a second diagram illustrating an example of details of the functional configuration of the server apparatus.

Next, the functional configuration of the server apparatus 110 according to the second embodiment will be described in detail. FIG. 10 is a second diagram illustrating an example of the details of the functional configuration of the server apparatus. The difference from the details of the functional configuration described with reference to FIG. 4 is that the functions of a communication unit 1010 are different from the functions of the communication unit 410 illustrated in FIG. 4, and that the speech data acquisition unit 420 and the text data generation unit 440 are not provided.

In addition to the functions of the communication unit 410 illustrated in FIG. 4, the communication unit 1010 further includes:

- A function of receiving the text data transmitted from the worker terminal 120, and storing the received text data in the text data storage unit 450 in association with the determination result determined by the determination unit 430; and
- A function of receiving the text data transmitted from the supporter terminal 130, and storing the received text data in the text data storage unit 450 in association with the determination result determined by the determination unit 430.

Functional Configuration of Supporter Terminal

Figure 11:
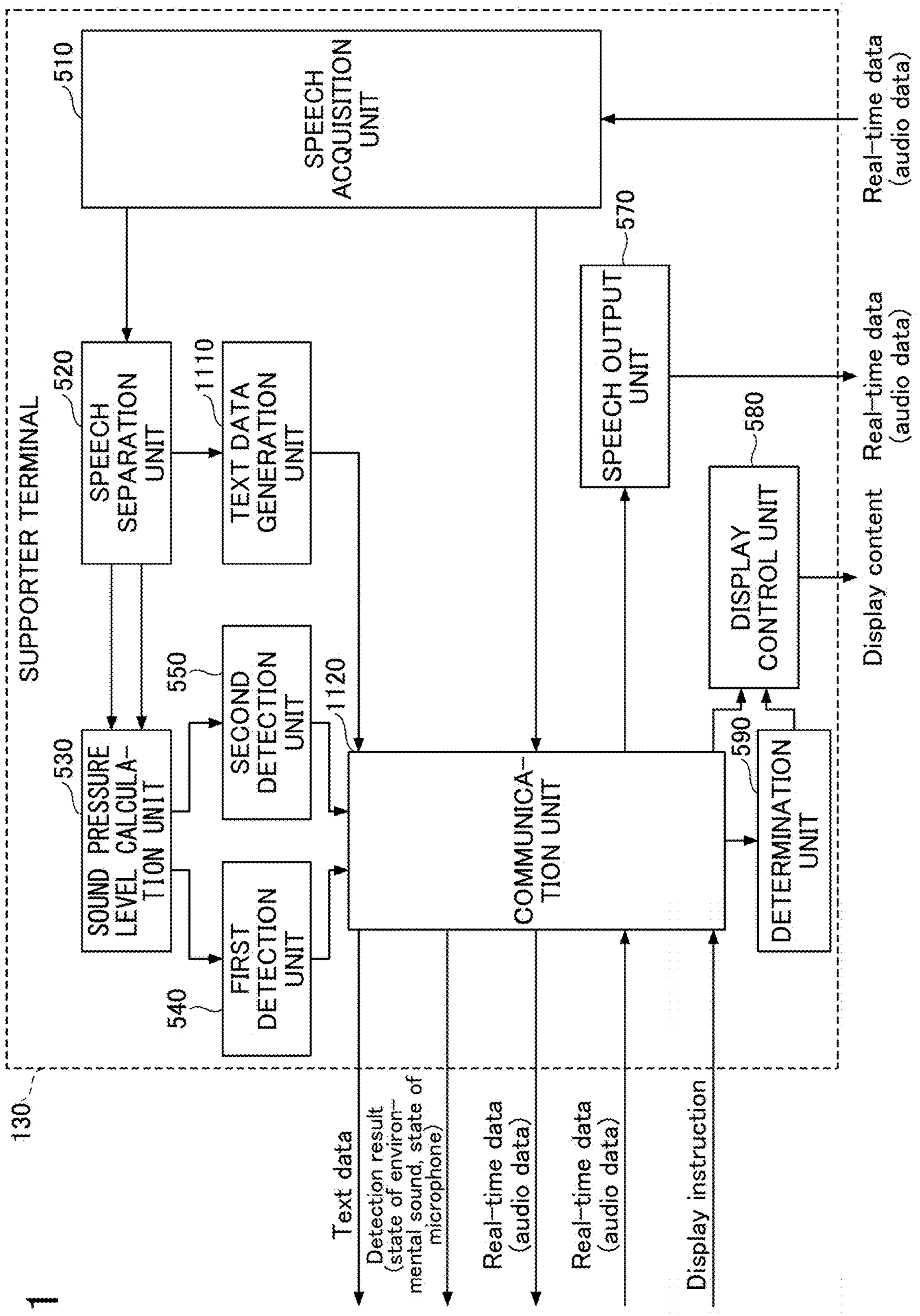
FIG. 11 is a second diagram illustrating an example of the functional configuration of the supporter terminal.

Next, the functional configuration of the supporter terminal 130 in the second embodiment will be described. FIG. 11 is a second diagram illustrating an example of the functional configuration of the supporter terminal. The difference from the functional configuration described with reference to FIG. 5 is that a text data generation unit 1110 is provided and that functions of a communication unit 1120 are different from the functions of the communication unit 560 illustrated in FIG. 5.

The text data generation unit 1110 converts the speech data notified from the speech separation unit 520 into the text data by performing the speech recognition, and notifies the communication unit 1120 of the converted text data.

The communication unit 1120 has a function of transmitting the text data notified from the text data generation unit 1110 to the server apparatus 110, in addition to the functions of the communication unit 560 illustrated in FIG. 3.

Flow Chart of Communication Process (1)

Figure 12:
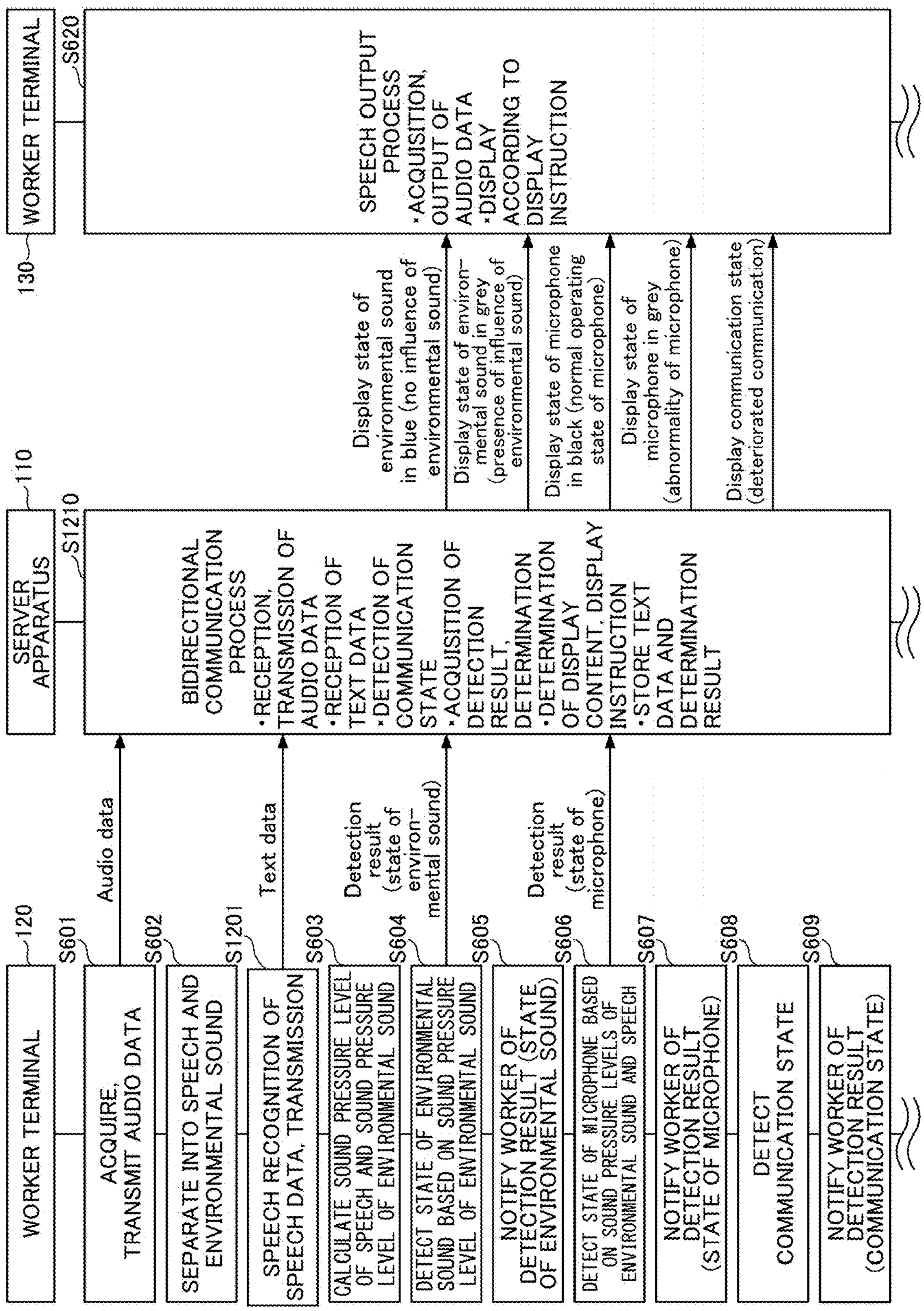
FIG. 12 is a second sequence diagram illustrating a flow chart of the communication process for a case where the worker terminal transmits the audio data to the supporter terminal in the bidirectional communication system.

Next, a flow chart of a communication process performed by the bidirectional communication system 100 according to the second embodiment will be described for a case where the audio data including the speech data based on the speech of the worker 150 is transmitted from the worker terminal 120 to the supporter terminal 130. FIG. 12 is a second sequence diagram illustrating the flow chart of the communication process for the case where the audio data is transmitted from the worker terminal to the supporter terminal in the bidirectional communication system. The difference from the first sequence diagram described with reference to FIG. 6 is the provision of steps S1201 and S1210.

In step S1201, the worker terminal 120 performs a speech recognition on the speech data, and converts the speech data into text data. The worker terminal 120 transmits the converted text data to the server apparatus 110.

In step S1210, the server apparatus 110 performs a bidirectional communication process. The bidirectional communication process performed by the server apparatus 110 includes an audio data reception and transmission process, a text data reception process, a communication state detection process, an acquisition and determination process on the detection result, a determination and display instruction process of the display content, and a storage process of the text data and the determination result. In this example, the server apparatus 110 stores the received text data in association with the determination result.

Flow Chart of Communication Process (2)

Figure 13:
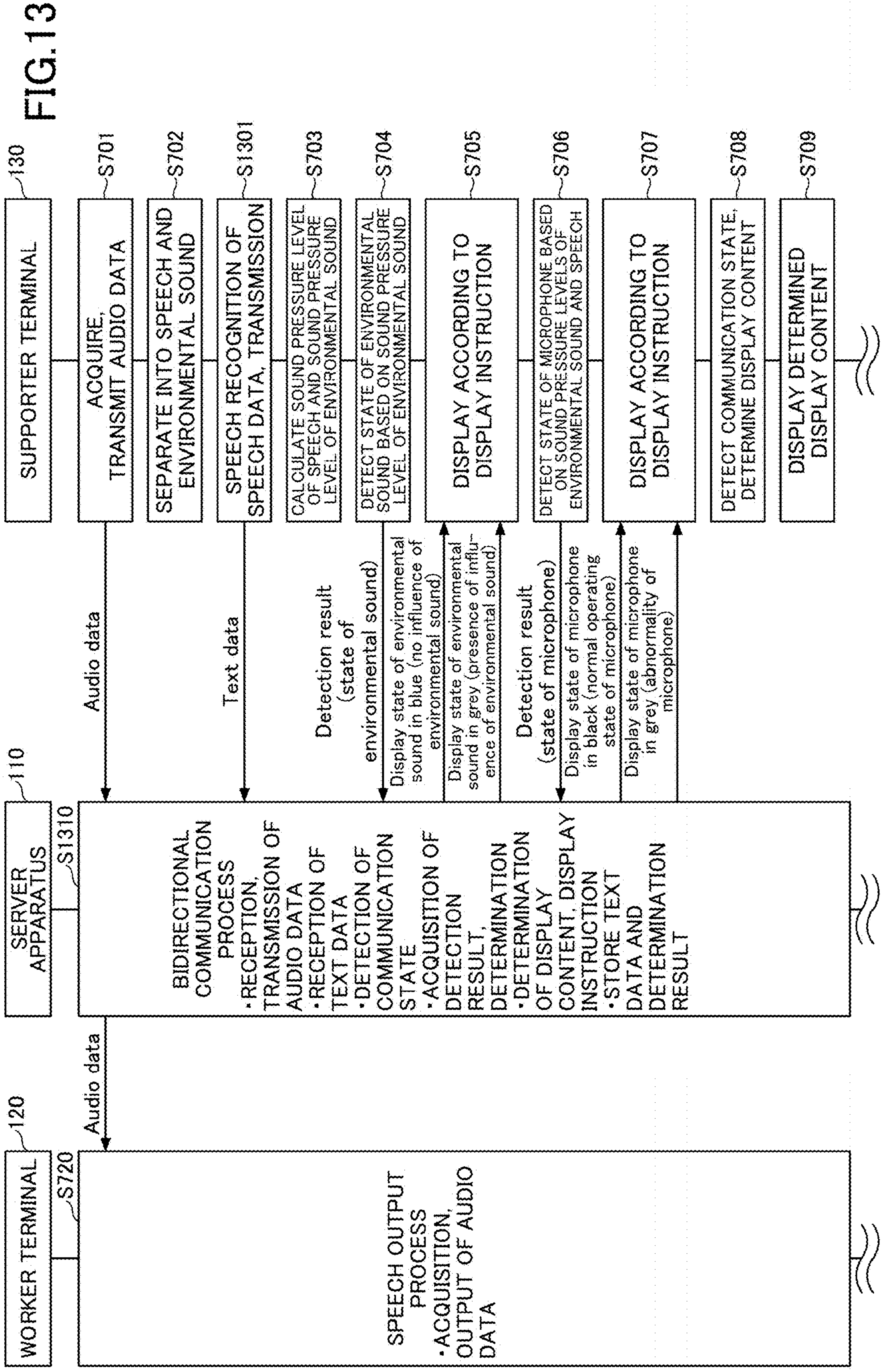
FIG. 13 is a second sequence diagram illustrating a flow chart of the communication process for the case where the supporter terminal transmits the audio data to the worker terminal in the bidirectional communication system.

Next, a flow chart of a communication process performed by the bidirectional communication system 100 according to the second embodiment will be described for a case where the audio data including the speech data based on the speech of the supporter 160 is transmitted from the supporter terminal 130 to the worker terminal 120. FIG. 13 is a second sequence diagram illustrating the flow chart of the communication process for the case where the audio data is transmitted from the supporter terminal to the worker terminal in the bidirectional communication system. The difference from the first sequence diagram described with reference to FIG. 7 is the provision of steps S1301 and S1310.

In step S1301, the supporter terminal 130 performs a speech recognition on the speech data, and converts the speech data into text data. The supporter terminal 130 transmits the converted text data to the server apparatus 110.

In step S1310, the server apparatus 110 performs a bidirectional communication process. The bidirectional communication process performed by the server apparatus 110 includes an audio data reception and transmission process, a text data reception process, a communication state detection process, an acquisition and determination process on the detection result, a determination and display instruction process of the display content, and a storage process of the text data and the determination result. In this example, the server apparatus 110 stores the received text data in association with the determination result.

Conclusion

As is clear from the description given heretofore, the bidirectional communication system 100, which is an example of the system according to the second embodiment, includes the same functions as those of the first embodiment. Further, the bidirectional communication system 100, which is an example of the system according to the second embodiment, is configured to perform the speech recognition process on the speech data in each client terminal, instead of performing the speech recognition process in the server apparatus 110 in a bulk.

Hence, according to the second embodiment, it is possible to obtain the same effects as those obtainable by the first embodiment, and to avoid a situation in which an accuracy of the speech recognition deteriorates due to noise that is added when the audio data is transmitted between each client terminal and the server apparatus.

Third Embodiment

The first and second embodiments are described above for the case where the bidirectional communication system is applied to the communication between:

- The worker 150 working at the work site; and
- The supporter 160 who remotely supports the worker 150 by remotely giving various work instructions to the worker 150.

However, the application of the bidirectional communication system is not limited to such a case, and the communication may be applied to other cases as long as the communication is performed remotely. A third embodiment will be described for a case where the bidirectional communication system is applied to a situation in which users at remote locations hold a conference.

System Configuration of Bidirectional Communication System

Figure 14:
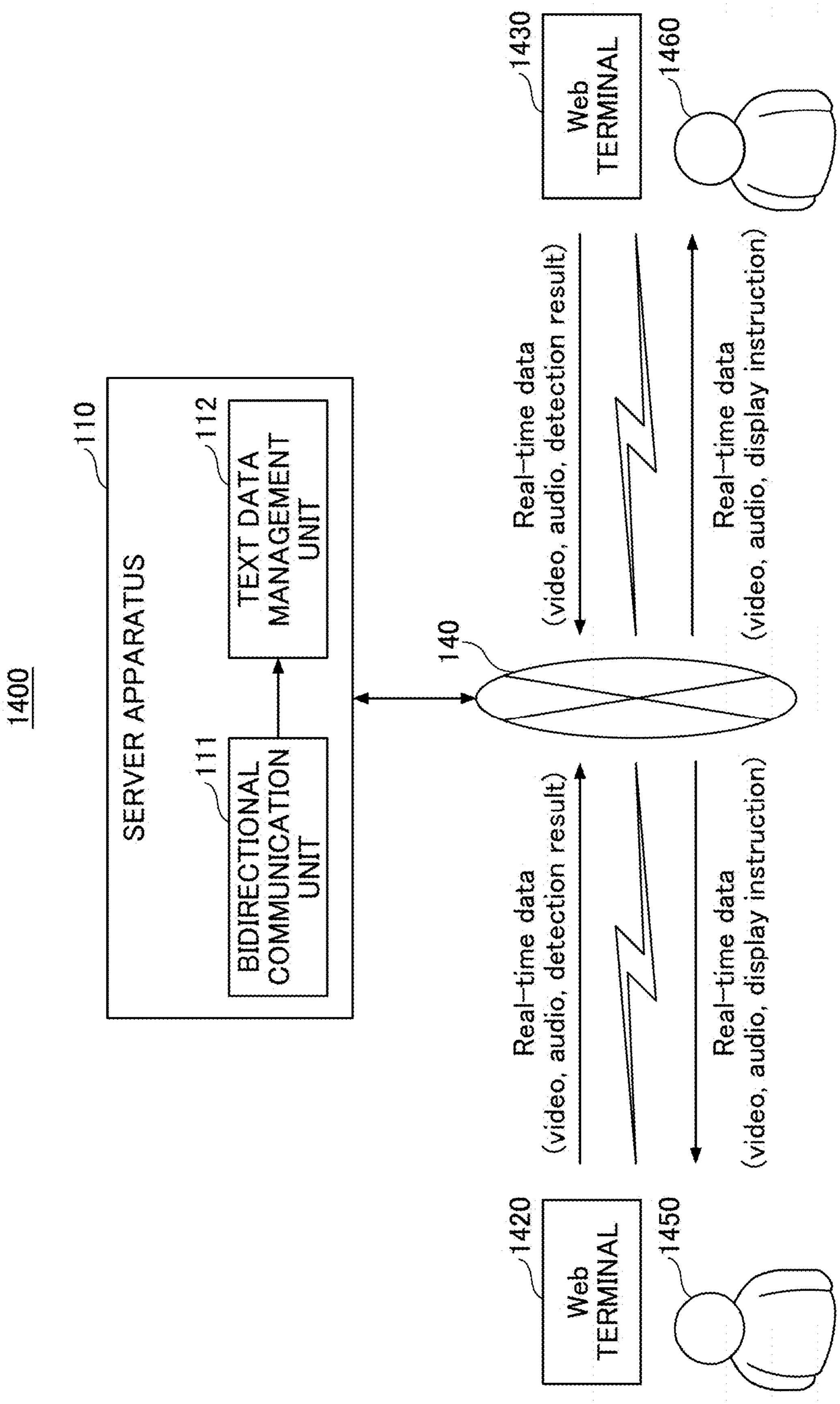
FIG. 14 is a second diagram illustrating an example of a system configuration of the bidirectional communication system.

First, a system configuration of the bidirectional communication system, which is an example of the system according to the third embodiment, will be described. FIG. 14 is a second diagram illustrating an example of the system configuration of the bidirectional communication system. As illustrated in FIG. 14, a bidirectional communication system 1400 includes a server apparatus 110, and client terminals (Web terminals 1420 and 1430).

The present embodiment will be described for a case where the bidirectional communication system is applied to a situation in which the conference is held between:

A user 1450; and

A user 1460.

The server apparatus 110 is the same as the server apparatus 110 described in the first or second embodiment.

In addition, the Web terminals 1420 and 1430 are the same as the supporter terminal 130 described in the first or second embodiment.

The text data and the determination result stored in the text data storage unit 450 (not illustrated in FIG. 14) in the third embodiment may be downloaded by the user 1450 or 1460 after the conference ends, and may be used as conference minutes, for example.

Example of Text Data Usage

Figure 15:
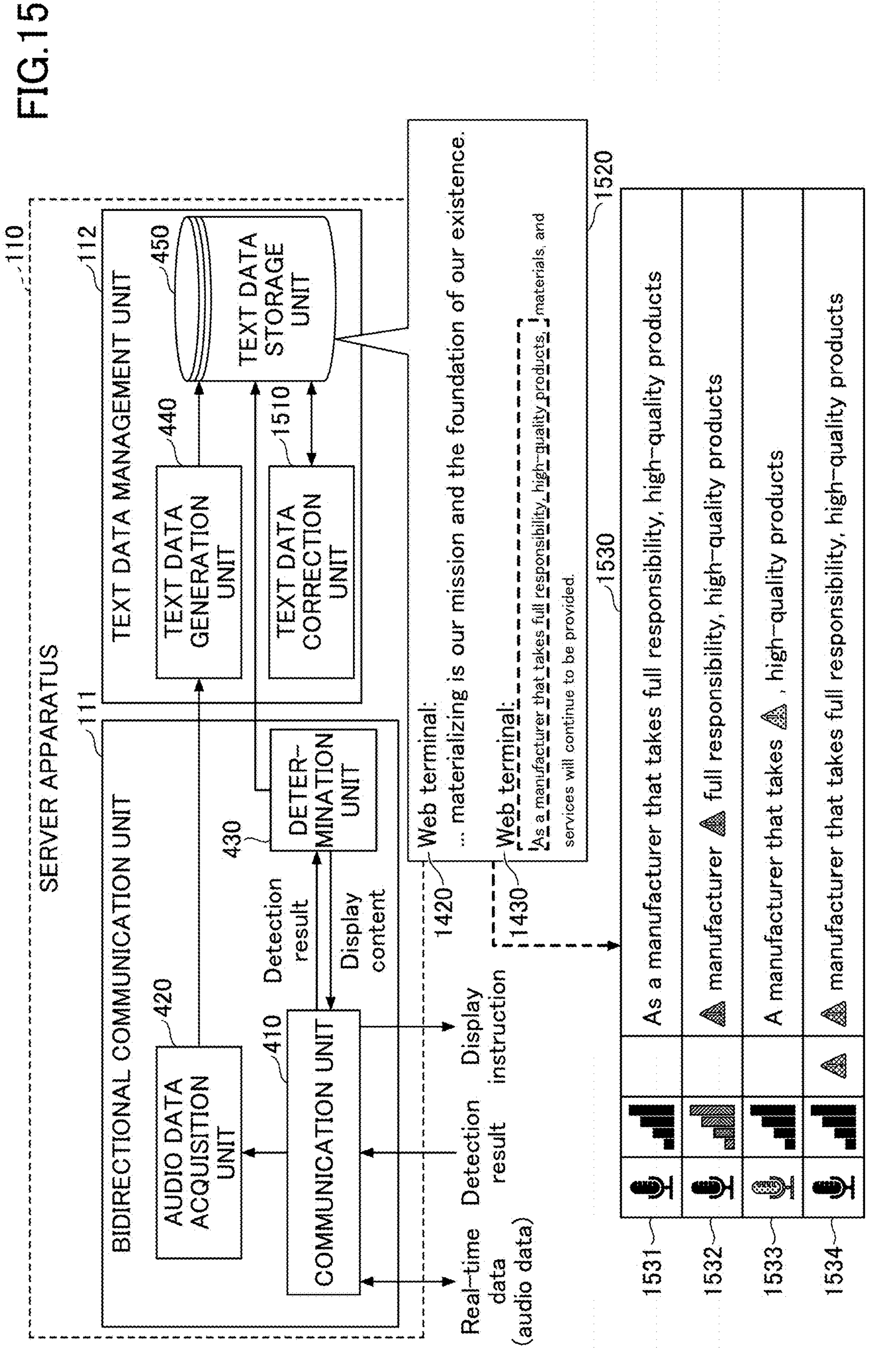
FIG. 15 is a diagram illustrating an example of text data usage.

Next, an example of text data usage in the bidirectional communication system 1400, which is an example of the system according to the third embodiment, will be described. FIG. 15 is a diagram illustrating an example of the text data usage. In the case of the example of the text data usage illustrated in FIG. 15, the text data management unit 112 further includes a text data correction unit 1510.

The text data correction unit 1510 corrects the text data stored in the text data storage unit 450, based on the associated determination result. Correction functions of the text data correction unit 1510 include:

- A function of visualizing the determination result by adding a mark indicating a cause of a predetermined determination result (the malfunction of the speech acquisition device 227, the presence of the influence of the environmental sound, or the deterioration of the communication) to the text data; and
- A function of correcting a portion associated with a predetermined determination result (the malfunction of the speech acquisition device 227, the presence of the influence of environmental sound, or the deterioration of the communication) in the text data, using text data before and after the portion associated with the predetermined determination result.

In FIG. 15, a reference numeral 1520 denotes an example of the text data stored in the text data storage unit 450. As illustrated in FIG. 15, the text data stored in the text data storage unit 450 is stored in such a manner that it is possible to identify which one of the Web terminal 1420 and the Web terminal 1430 converted the audio data into the text data.

In FIG. 15, a reference numeral 1530 indicates a state in which an area surrounded by a dotted line, among the text data indicated by the reference numeral 1520, is added with marks by the text data correction unit 1510 to visualize the determination results.

Among these determination results, a reference numeral 1531 indicates the text data for a case where it is determined that the speech data can be converted into the text data, or that the quality of the converted text data after the conversion does not deteriorate, as a result of being notified of the "no influence of environmental sound", "normal operating state of microphone", and "normal communication".

On the other hand, a reference numeral 1532 indicates the text data after the addition of the mark for a case where it is determined that the speech data cannot be converted into the text data, or that the quality of the converted text data after the conversion deteriorates, due to the influence of the environmental sound as a result of being notified of the "presence of influence of environmental sound". As indicated by the reference numeral 1532, the text data correction unit 1510 adds a mark according to the cause to a corresponding position of the text data.

Similarly, a reference numeral 1533 indicates the text data after the addition of the mark for a case where it is determined that the speech data cannot be converted into the text data, or that the quality of the converted text data after the conversion deteriorates, due to the malfunction of the speech acquisition device 227 as a result of being notified of the "abnormality of microphone". As indicated by the reference numeral 1533, the text data correction unit 1510 adds a mark according to the cause to a corresponding position of the text data.

Similarly, a reference numeral 1534 indicates the text data after the addition of the mark for a case where it is determined that the speech data cannot be converted into the text data, or that the quality of the converted text data after the conversion deteriorates, due to the deterioration of the communication as a result of being notified of the "deterioration of communication". As indicated by the reference numeral 1534, the text data correction unit 1510 adds a mark according to the cause to a corresponding position of the text data.

As described above, in the third embodiment, the server apparatus 110 adds a mark according to the cause of the determination result to the text data. Thus, according to the third embodiment, the client terminal (the Web terminal 1420 or 1430) can visualize the determination result associated with the text data when displaying the text data. As a result, according to the third embodiment, even in a case where an appropriate speech recognition is not performed on a portion of the text data, the users 1450 and 1460 can understand the cause thereof.

The description given heretofore relate to a specific example of the function of visualizing the cause of the determination result among the correction functions of the text data correction unit 1510, but a correction function using text data before and after a portion associated with a predetermined determination result can:

- Correct the text data indicated by the reference numerals 1532 through 1534,
- Into the text data indicated by the reference numeral 1531, for example.

This is because the determination result is displayed during the communication, and it is thus possible to shorten a time range in which the situation unsuitable for the speech recognition occurs (it is possible to keep the time range within a correctable time range using the text data before and after the portion associated with the predetermined determination result).

Conclusion

As is clear from the description given heretofore, the bidirectional communication system 1400, which is an example of the system according to the third embodiment, includes the same functions as those of the first or second embodiment, and further includes:

- A function of visualizing the cause of the determination result associated with the text data; and
- A function of correcting a portion associated with the determination result using the text data before and after the portion associated with the determination result.

Hence, according to the third embodiment, the same effects as those of the first or second embodiment are obtainable, and further, even in the case where an appropriate speech recognition is not performed on a portion of the text data, the cause of the malfunction can be understood. Further, the data can be corrected to an appropriate text data.

Fourth Embodiment

In the first and second embodiments described above, a description of a communication process for a case where video data is transmitted to the supporter terminal 130 is omitted, but the video data may be stored in association with the text data, for example. In this case, a work content of the worker 150 may be identified and converted into character information by analyzing the video data, and the identified work content may be stored in association with the text data, for example.

Figure 16:
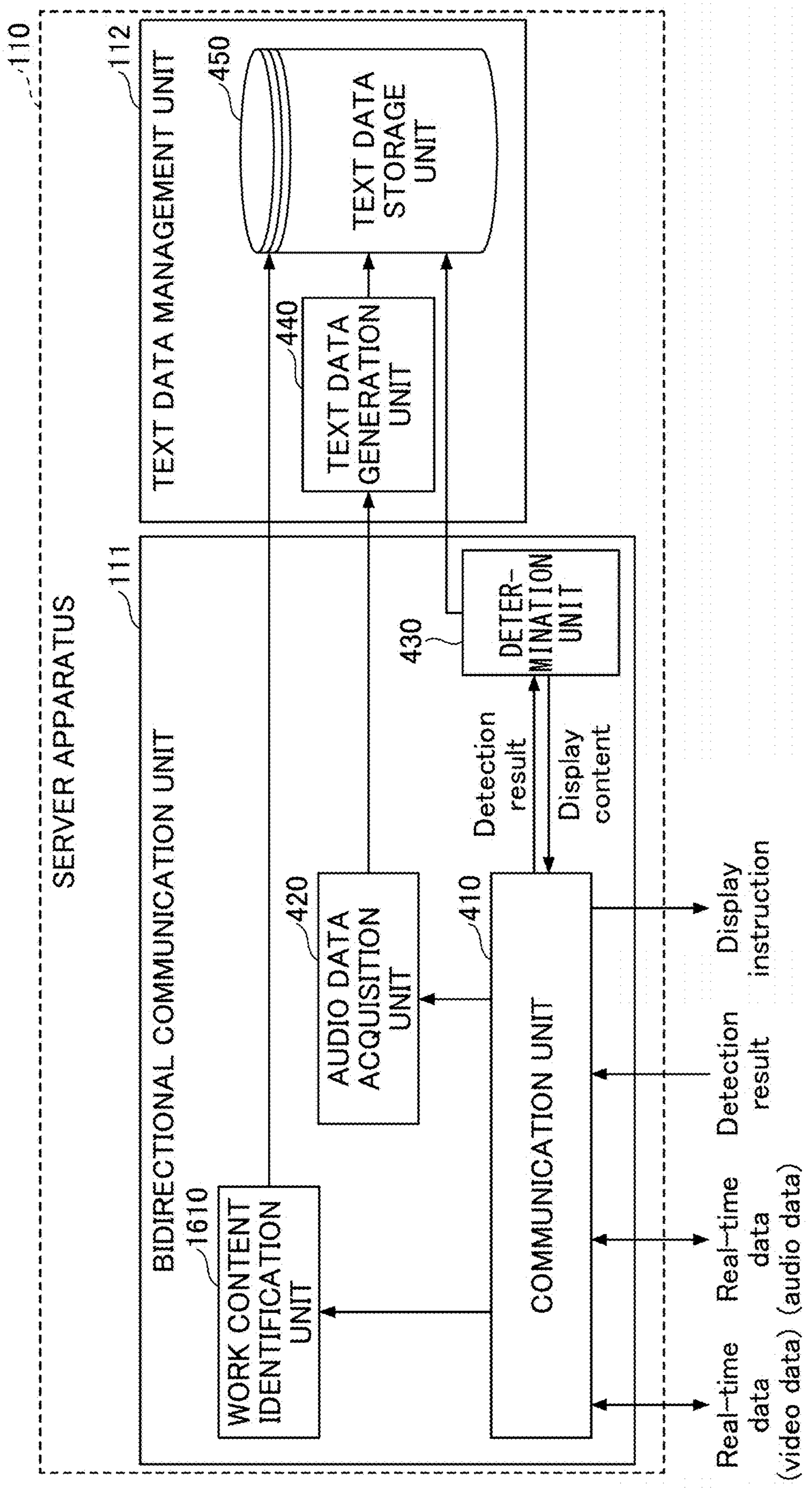
FIG. 16 is a third diagram illustrating an example of the details of the functional configuration of the server apparatus.

FIG. 16 is a third diagram illustrating an example of the details of the functional configuration of the server apparatus. The difference from the first diagram illustrated in FIG. 4 is the provision of a work content identification unit 1610.

The work content identification unit 1610 analyzes the video data notified from the communication unit 410, and identifies the work content to be performed by the worker 150, thereby converting the video data into the character information. The work content identification unit 1610 stores the identified work content in the text data storage unit 450 in association with the text data and the determination result.

Accordingly, by storing the work content in association with the text data and the determination result, when the supporter 160 browses the text data, for example, the supporter 160 can check the speech content of the worker 150 after recognizing the work content to be performed by the worker 150.

Fifth Embodiment

In the first and second embodiments, the worker terminal 120 notifies the worker 150 of the determination result via the speech output device 228, as described above. However, the method of notifying the worker 150 of the determination result is not limited to the above. For example, an LED or the like may be provided on the worker terminal 120 to emit light in a color according to the determination result. Alternatively, a vibrator or the like may be provided on the worker terminal 120, and the worker terminal 120 may be vibrated at a frequency or amplitude according to the determination result.

The first and second embodiments are described above for a case where the server apparatus 110 transmits a display instruction according to a determination result for the worker terminal 120, and a display instruction according to a determination result for the supporter terminal 130, to the supporter terminal 130. However, the instruction transmitted by the server apparatus 110 is not limited to the display instruction according to the determination result, and a transmission destination is not limited to the supporter terminal 130. For example, the server apparatus 110 may be configured to transmit a notification instruction according to the determination result to the worker terminal 120.

In each of the embodiments described above, the influence of the environmental sound and the abnormality of the microphone are described as the cause of the inability to convert the audio data into the text data or the cause of the deterioration in the quality of converted text data after the conversion. However, the cause of the inability to convert the audio data into the text data or the cause of the deterioration in the quality of the converted text data after the conversion is not limited to the influence of the environmental sound or the abnormality of the microphone, and for example, the cause may be an influence of audio data preceding the audio data being acquired on the audio data being acquired. This is because the audio data preceding the audio data being acquired may affect the audio data being acquired due to echo.

The presence or absence of the influence of the audio data preceding the audio data being acquired on the audio data being acquired can be determined by the same mechanism that determines the presence or absence of the influence of the environmental sound. For example, the presence or absence of the influence on the audio data being acquired can be determined by separating the audio data preceding the audio data being acquired from the audio data being acquired, and calculating a magnitude (a sound pressure level) of the audio data preceding the audio data being acquired.

A display method for displaying the presence or absence of the influence on the audio data being acquired may be the same as, or different from, the display method for displaying the presence or absence of the influence of the environmental sound.

Moreover, in each of the embodiments described above, the state of the environmental sound is detected by determining whether or not the sound pressure level of the environmental audio data notified from the sound pressure level calculation unit 330 is greater than or equal to the predetermined threshold value (that is, an absolute value). However, the method of detecting the state of the environmental sound is not limited thereto, and for example, the state of the environmental sound may be detected by determining whether or not a ratio between the magnitude (the sound pressure level) of the audio data and the magnitude (the sound pressure level) of the environmental audio data satisfies a predetermined condition (that is, a relative value). Specifically, in a case where the sound pressure level of the audio data is less than the sound pressure level of the environmental audio data, it may be determined that there is presence of the influence of the environmental sound may be determined, and in a case where the sound pressure level of the audio data is greater than or equal to the sound pressure level of the environmental audio data, it may be determined that there is no influence of the environmental sound.

Further, in each of the embodiments described above, the details of the method of acquiring the audio data by the audio data acquisition units 310 and 510 are not described. However, the audio data acquisition units 310 and 510 may be configured to perform various kinds of preprocesses when acquiring the audio data. The preprocess may include a process of removing a high-frequency component from the audio data using a lowpass filter, for example, and a process of removing hum noise by removing a low-frequency component from the audio data, for example. Alternatively, the preprocessing may include a process of canceling howling, echo, or the like by analyzing a waveform for each predetermined section, for example.

In addition, in each of the embodiments described above, the situation of the worker terminal 120 and the situation of the supporter terminal 130 are displayed using the icons illustrated in FIG. 8. However, the method of displaying the status of the worker terminal 120 and the status of the supporter terminal 130 is not limited thereto, and the statuses may be displayed in other arbitrary display modes.

Moreover, in the third embodiment, the mark illustrated in FIG. 15 is used as the mark indicating the cause of the predetermined determination result added to the text data. However, the method of displaying the mark indicating the cause of the predetermined determination result added to the text data is not limited thereto, and the mark may be displayed in other arbitrary display modes.

Further, in each of the embodiments described above, the client terminal transmits the audio data to the server apparatus 110 in real time. However, the configuration of the client terminal is not limited thereto. For example, the client terminal may be configured to transmit the audio data in real time and successively store the audio data, and in a case where a request is made from the server apparatus 110, to transmit the audio data in a range according to the request to the server apparatus 110.

In addition, the first and second embodiments describe the case where the text data generation unit is implemented in the server apparatus 110, and the case where the text data generation unit is implemented in the client terminals (the worker terminal 120 and the supporter terminal 130). However, a variation of the functional allocation between the server apparatus 110 and the client terminals (the worker terminal 120 and the supporter terminal 130) is not limited thereto. For example, the determination unit 430 of the server apparatus 110 may be implemented in one or a plurality of client terminal (the worker terminal 120 and/or the supporter terminal 130).

Moreover, the text data correction unit 1510 described in the third embodiment may be implemented in the bidirectional communication system 100 described in the first embodiment. In this case, when the text data is downloaded and displayed, the supporter terminal 130 can visualize the determination result associated with the text data. As a result, according to the fifth embodiment, even in the case where an appropriate speech recognition is not performed in a portion of the text data, the supporter 160 can understand the cause thereof.

Further, in the first embodiment, the case where the wearable terminal is used as the worker terminal 120 is described, however, a portable terminal may be used in place of the wearable terminal.

In addition, in each of the embodiments described above, the server apparatus 110 is described as executing the bidirectional communication program by itself. However, in a case where the server apparatus 110 is configured by one or a plurality of computers, for example, the bidirectional communication program may be installed in each of the one or plurality of computers and executed in a form of distributed computing.

Moreover, in each of the embodiments described above, the method of downloading and installing the client program via the network is described as an example of the method of installing the client program. Although a source of the program download is not particularly mentioned, in the case of installing the program by such a method, the source of the program download may be a server apparatus accessibly storing the client program, for example. The server apparatus may be an apparatus on a cloud, receiving an access from the client terminal (the supporter terminal 130, the Web terminal 1420, or the Web terminal 1430) via a network, and downloading the client program on condition of payment. That is, the server apparatus may be an apparatus on the cloud, providing a client program providing service.

Although the embodiments are described above, it will be understood that various modifications may be made in form and detail without departing from the subject matter and scope of the claims.

This application is based upon and claims priority to Japanese Patent Application No. 2022-140702 filed on Sep. 5, 2022, the entire contents of which are incorporated herein by reference.

DESCRIPTION OF REFERENCE NUMERALS

100: bidirectional communication system
110: server apparatus
111: bidirectional communication unit
112: text data management unit
120: worker terminal
130: supporter terminal
310: audio data acquisition unit
320: speech separation unit
330: sound pressure level calculation unit
340: first detection unit
350: second detection unit
360: communication unit
370: determination unit
380: speech output unit
410: communication unit
420: speech data acquisition unit
430: determination unit
440: text data generation unit
510: audio data acquisition unit
520: speech separation unit
530: sound pressure level calculation unit
540: first detection unit
550: second detection unit
560: communication unit
570: speech output unit
580: display control unit
590: determination unit
800: display screen
910: text data generation unit
920: communication unit
1010: communication unit
1110: text data generation unit
1120: communication unit
1400: bidirectional communication system
1420: Web terminal
1430: Web terminal
1510: text data correction unit
1610: work content identification unit

The invention claimed is:

1. A system comprising:
a first terminal;
a second terminal physically distinct from and spatially separated from the first terminal; and
a server apparatus configured to perform a bidirectional communication between the first terminal and the second terminal, wherein:
the first terminal includes:
a speech acquisition device configured to acquire audio data including speech data and environmental sound in real-time,
a first processor configured to detect a state of the environmental sound and a state of the speech acquisition device and output a detection result indicating the state of the environmental sound and the state of the speech acquisition device, and
a first communication device configured to transmit the acquired audio data and the detection result to the server apparatus, the server apparatus includes:
a second communication device communicable with the first terminal and the second terminal and configured to receive the audio data and the detection result from the first terminal, and a second processor configured to:

convert the speech data of the received audio data into text data in real-time;

determine, before a communication with the first terminal ends, whether or not the speech data being acquired during the communication with the first terminal can be converted into the text data;

determine that a quality of the text data after the conversion deteriorates due to an influence of the environmental sound in a case where a magnitude of the environmental sound included in the audio data acquired during the communication with the first terminal is greater than or equal to a predetermined threshold value, or in a case where a ratio between a magnitude of the speech data and the magnitude of the environmental sound included in the audio data acquired during the communication with the first terminal satisfies a predetermined condition;

determine that the speech data acquired during the communication with the first terminal cannot be converted into the text data due to a malfunction of the speech acquisition device included in the first terminal in a case where both a magnitude of the speech data being acquired and a magnitude of the environmental sound included in the audio data acquired during the communication with the first terminal are less than a predetermined threshold value;

determine that the speech data acquired during the communication with the first terminal cannot be converted into the text data due to a deterioration of a communication state of the communication with the first terminal in a case where the audio data is not transmitted from the first terminal for a certain period of time and the communication with the first terminal is determined as being disconnected; and transmit a display instruction based on a determination result indicating that the quality of the text data after the conversion deteriorates, and a determination result indicating that the speech data cannot be converted into the text data to the second terminal via the second communication device, the display instruction includes a display content on the state of the environmental sound or the state of the speech acquisition device and a reason that the quality of the text data after the conversion deteriorates and a reason that the speech data cannot be converted into the text data, and the second terminal includes a third communication device communicable with the server apparatus, a display device, and a third processor configured to display the determination result of the server apparatus and the reason for the determination result on the display device in response to the display instruction received by the third communication device from the server apparatus.

2. The system as claimed in claim 1, wherein the third processor included in the second terminal displays the determination result on the display device using an icon indicating a reason that the speech data cannot be converted into the text data and a reason that a quality of the converted text data after the conversion deteriorates.

3. The system as claimed in claim 1, wherein:

the first terminal further includes an output device, and the first processor included in the first terminal is configured to:

determine, during the acquisition of the speech data by the speech acquisition device, whether or not a quality of the converted text data after the conversion of the speech data being acquired deteriorates; and output a determination result on the quality of the converted text data to the output device to notify the determination result to a user of the first terminal by at least one of sound, light, and vibration.

4. The system as claimed in claim 1, wherein the second processor included in the server apparatus stores the text data and the determination result in association with each other.

5. The system as claimed in claim 4, wherein the third processor included in the second terminal reads the stored text data and displays the read text data on the display device in a display mode according to the determination result.

6. The system as claimed in claim 4, wherein the second processor included in the server apparatus corrects a portion that cannot be converted into the text data or a portion where a quality deteriorates, using text data before and after the portion that cannot be converted into the text data or before and after the portion where the quality deteriorates.

7. The system as claimed in claim 4, wherein:

the first terminal further includes an imaging device configured to capture an image, the first processor of the first terminal transmits the image captured by the imaging device to the server apparatus via the first communication device, the second processor included in the server apparatus identifies a work content of the worker from the image received by the second communication device from the first terminal, and stores the identified work content in association with the determination result.

8. The system as claimed in claim 4, wherein the first processor included in the first terminal stores the speech data acquired by the speech acquisition device during the communication with the server apparatus, and in a case where a request is received by the first communication device from the server apparatus, transmits the speech data in a range according to the request to the server apparatus via the first communication device.

9. A server apparatus comprising:

a communication device configured to perform a bidirectional communication between a first terminal and a second terminal physically distinct from and spatially separated from the first terminal;

a memory configured to store a program; and a processor configured to execute the program stored in the memory and perform a process including:

converting speech data included in audio data received from the first terminal via the communication device into text data, the audio data further including environmental sound at the first terminal;

determining, before a communication with the first terminal ends, whether or not the speech data being acquired during the communication with the first terminal can be converted into the text data based on a detection result received from the first terminal via the communication device, the detection result indicating a state of the environmental sound at the first terminal and a state of a speech acquisition device that acquires the audio data at the first terminal;

determining that a quality of the text data after the conversion deteriorates due to an influence of the environmental sound in a case where a magnitude of the environmental sound included in the audio data acquired during the communication with the first terminal is greater than or equal to a predetermined threshold value, or in a case where a ratio between a magnitude of the speech data and the magnitude of the environmental sound included in the audio data acquired during the communication with the first terminal satisfies a predetermined condition;

determining that the speech data acquired during the communication with the first terminal cannot be converted into the text data due to a malfunction of the speech acquisition device at the first terminal in a case where both a magnitude of the speech data being acquired and a magnitude of the environmental sound included in the audio data acquired during the communication with the first terminal are less than a predetermined threshold value;

determining that the speech data acquired during the communication with the first terminal cannot be converted into the text data due to a deterioration of a communication state of the communication with the first terminal in a case where the audio data is not transmitted from the first terminal for a certain period of time and the communication with the first terminal is determined as being disconnected; and transmitting a display instruction based on a determination result indicating that the quality of the text data after the conversion deteriorates, and a determination result indicating that the speech data cannot be converted into the text data to the second terminal via the communication device, wherein the display instruction includes a display content on the state of the environmental sound or the state of the speech recognition device and a reason that the quality of the text data after the conversion deteriorates and a reason that the speech data cannot be converted into the text data, thereby causing the second terminal to display the determination result and the reason for the determination result in response to the display instruction.

10. A non-transitory computer-readable storage medium having stored therein a program which, when executed by a computer of a server apparatus, causes the computer to perform a process including:

performing a bidirectional communication between a first terminal and a second terminal physically distinct from and spatially separated from the first terminal via a communication device of the server apparatus;

converting speech data included in audio data received from the first terminal via the communication device into text data, the audio data further including environmental sound at the first terminal;

determining, before a communication with the first terminal ends, whether or not the speech data being acquired during the communication with in the first terminal can be converted into the text data based on a detection result received from the first terminal via the communication device, the detection result indicating a state of the environmental sound at the first terminal and a state of a speech acquisition device that acquires the audio data at the first terminal;

determining that a quality of the text data after the conversion deteriorates due to an influence of the environmental sound in a case where a magnitude of the environmental sound included in the audio data acquired during the communication with the first terminal is greater than or equal to a predetermined threshold value, or in a case where a ratio between a magnitude of the speech data and the magnitude of the environmental sound included in the audio data acquired during the communication with the first terminal satisfies a predetermined condition;

determining that the speech data acquired during the communication with the first terminal cannot be converted into the text data due to a malfunction of the speech acquisition device at the first terminal in a case where both a magnitude of the speech data being acquired and a magnitude of the environmental sound included in the audio data acquired during the communication with the first terminal are less than a predetermined threshold value;

determining that the speech data acquired during the communication with the first terminal cannot be converted into the text data due to a deterioration of a communication state of the communication with the first terminal in a case where the audio data is not transmitted from the first terminal for a certain period of time and the communication with the first terminal is determined as being disconnected; and transmitting a display instruction based on a determination result indicating that the quality of the text data after the conversion deteriorates, and a determination result indicating that the speech data cannot be converted into the text data to the second terminal via the communication device, wherein the display instruction includes a display content on the state of the environmental sound or the state of the speech recognition device and a reason that the quality of the text data after the conversion deteriorates and a reason that the speech data cannot be converted into the text data, thereby causing the second terminal to display the determination result and the reason for the determination result in response to the display instruction.

* * * * *